US008457353B2

(12) United States Patent
Reville et al.

(10) Patent No.: US 8,457,353 B2
(45) Date of Patent: Jun. 4, 2013

(54) GESTURES AND GESTURE MODIFIERS FOR MANIPULATING A USER-INTERFACE

(75) Inventors: Brendan Reville, Seattle, WA (US); Ali Vassigh, Redmond, WA (US); Christian Klein, Duvall, WA (US); Adam Poulos, Redmond, WA (US); Jordan Andersen, Kirkland, WA (US); Zack Fleischman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 12/782,380

(22) Filed: May 18, 2010

(65) Prior Publication Data

US 2011/0289456 A1    Nov. 24, 2011

(51) Int. Cl.
*G06K 9/00* (2006.01)
(52) U.S. Cl.
USPC ............................................. 382/103
(58) Field of Classification Search
USPC .................. 382/103, 106, 107, 154; 348/113, 348/114, 169
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Qian, et al., "A Gesture-Driven Multimodal Interactive Dance System," 2004 IEEE International Conference on Multimedia and Expo (ICME), 2004, pp. 1579-1582.

(Continued)

*Primary Examiner* — Claire X Wang
*Assistant Examiner* — Shervin Nakhjavan
(74) *Attorney, Agent, or Firm* — Vierra Magen Marcus LLP

(57) ABSTRACT

Gesture modifiers are provided for modifying and enhancing the control of a user-interface such as that provided by an operating system or application of a general computing system or multimedia console. Symbolic gesture movements are performed by a user in mid-air. A capture device generates depth images and a three-dimensional representation of a capture area including a human target. The human target is tracked using skeletal mapping to capture the mid-air motion of the user. Skeletal mapping data is used to identify movements corresponding to pre-defined gestures using gesture filters. Detection of a viable gesture can trigger one or more user-interface actions or controls. Gesture modifiers are provided to modify the user-interface action triggered by detection of a gesture and/or to aid in the identification of gestures.

16 Claims, 12 Drawing Sheets

U.S. PATENT DOCUMENTS

| | | | |
|---|---|---|---|
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,002,808 A | 12/1999 | Freeman | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,176,782 B1 * | 1/2001 | Lyons et al. | 463/36 |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,222,465 B1 * | 4/2001 | Kumar et al. | 341/20 |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,498,628 B2 * | 12/2002 | Iwamura | 348/734 |
| 6,503,195 B1 | 1/2003 | Keller et al. | |
| 6,512,838 B1 | 1/2003 | Rafii et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,819,782 B1 * | 11/2004 | Imagawa et al. | 382/115 |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,095,401 B2 | 8/2006 | Liu et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 * | 12/2007 | Fujimura et al. | 382/103 |
| 7,317,836 B2 * | 1/2008 | Fujimura et al. | 382/203 |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,656,394 B2 | 2/2010 | Westerman et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 * | 3/2011 | Hildreth et al. ............... 345/156 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,180,114 | B2 * | 5/2012 | Nishihara et al. ............. 382/114 |
| 2003/0076293 | A1 * | 4/2003 | Mattsson ....................... 345/156 |
| 2004/0193413 | A1 | 9/2004 | Wilson et al. |
| 2007/0216642 | A1 | 9/2007 | Kneissler et al. |
| 2008/0026838 | A1 | 1/2008 | Dunstan et al. |
| 2008/0122786 | A1 * | 5/2008 | Pryor et al. .................... 345/156 |
| 2008/0141181 | A1 | 6/2008 | Ishigaki et al. |
| 2008/0152191 | A1 | 6/2008 | Fujimura et al. |
| 2008/0219502 | A1 | 9/2008 | Shamaie |
| 2009/0027337 | A1 | 1/2009 | Hildreth |
| 2009/0040215 | A1 | 2/2009 | Afzulpurkar et al. |
| 2009/0074248 | A1 | 3/2009 | Cohen et al. |
| 2009/0077504 | A1 * | 3/2009 | Bell et al. ....................... 715/863 |
| 2009/0103780 | A1 * | 4/2009 | Nishihara et al. ............. 382/103 |
| 2009/0109036 | A1 * | 4/2009 | Schalla et al. ............. 340/573.1 |
| 2009/0131151 | A1 | 5/2009 | Harris et al. |
| 2009/0141933 | A1 | 6/2009 | Wagg |
| 2009/0175540 | A1 * | 7/2009 | Dariush et al. ................ 382/195 |
| 2009/0217211 | A1 | 8/2009 | Hildreth et al. |
| 2009/0221368 | A1 | 9/2009 | Yen et al. |
| 2009/0222149 | A1 * | 9/2009 | Murray et al. ..................... 701/2 |
| 2009/0268945 | A1 | 10/2009 | Wilson et al. |
| 2009/0274339 | A9 * | 11/2009 | Cohen et al. .................. 382/103 |
| 2009/0309846 | A1 | 12/2009 | Trachtenberg et al. |
| 2010/0091110 | A1 * | 4/2010 | Hildreth ........................ 348/169 |
| 2010/0166258 | A1 * | 7/2010 | Chai et al. ..................... 382/103 |
| 2010/0208038 | A1 | 8/2010 | Kutliroff et al. |
| 2010/0295782 | A1 | 11/2010 | Binder |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009006735 A1 | 1/2009 |
| WO | W02009059065 | 5/2009 |

OTHER PUBLICATIONS

Shivappa, et al., "Person Tracking With Audio-visual Cues Using The Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Response to Office Action dated Sep. 5, 2012, U.S. Appl. No. 12/782,377, filed May 18, 2010.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Final Office Action dated Jan. 7, 2013, U.S. Appl. No. 12/782,377, filed May 18, 2010.

Binns, Francis Styrion, "Multi-"Touch" Interaction via Visual Tracking," Bachelor of Science in Computer Science with Honours, The University of Bath, May 2009, 81 pages.

Jaume-I-Capo, A., et al., "Real-Time Recognition of Human Gestures for 3D Interaction," F.J. Perales and R.B. Risher (Eds.): AMDO 2008, LNCS 5098, Jul. 2008, pp. 419-430.

Tollmar, K., et al., "Gesture + Play Exploring Full-Body Navigation for Virtual Environments," Conference on Computer Vision and Pattern Recognition Workshop, Jun. 2003, 8 pages.

Nishino, H., "Interactive Two-Handed Gesture Interface in 3D Virtual Environments," ACM VRST '97, Lausanne Switzerland, Sep. 1997, 8 pages.

"2010 Horizon Report—The Web Version," [http://wp.nmc.org/horizon2010/chapters/gesture-based-computing/], Jan. 2010, 9 pages.

U.S. Appl. No. 12/703,115 entitled "Handles Interactions For Human-Computer Interface," filed Feb. 9, 2010.

U.S. Appl. No. 12/642,589 entitled "Gesture Style Recognition And Rewards," filed Feb. 18, 2009.

U.S. Appl. No. 12/641,788 entitled "Motion Detection Using Depth Images," filed Feb. 18, 2009.

U.S. Appl. No. 12/422,661 entitled "Gesture Recognizer System Architecture," filed Apr. 13, 2009.

U.S. Appl. No. 12/391,150 entitled "Standard Gestures," filed Feb. 23, 2009.

U.S. Appl. No. 12/474,655 entitled "Gesture Tool," filed May 29, 2009.

U.S. Appl. No. 12/475,308 entitled "Device For Identifying And Tracking Multiple Humans Over Time."

U.S. Appl. No. 12/782,377 entitled "Gestures And Gesture Recognition For Manipulating A User Interface," filed May 18, 2010.

Non-final Office Action dated Jun. 5, 2012, U.S. Appl. No. 12/782,377, filed May 18, 2010.

* cited by examiner

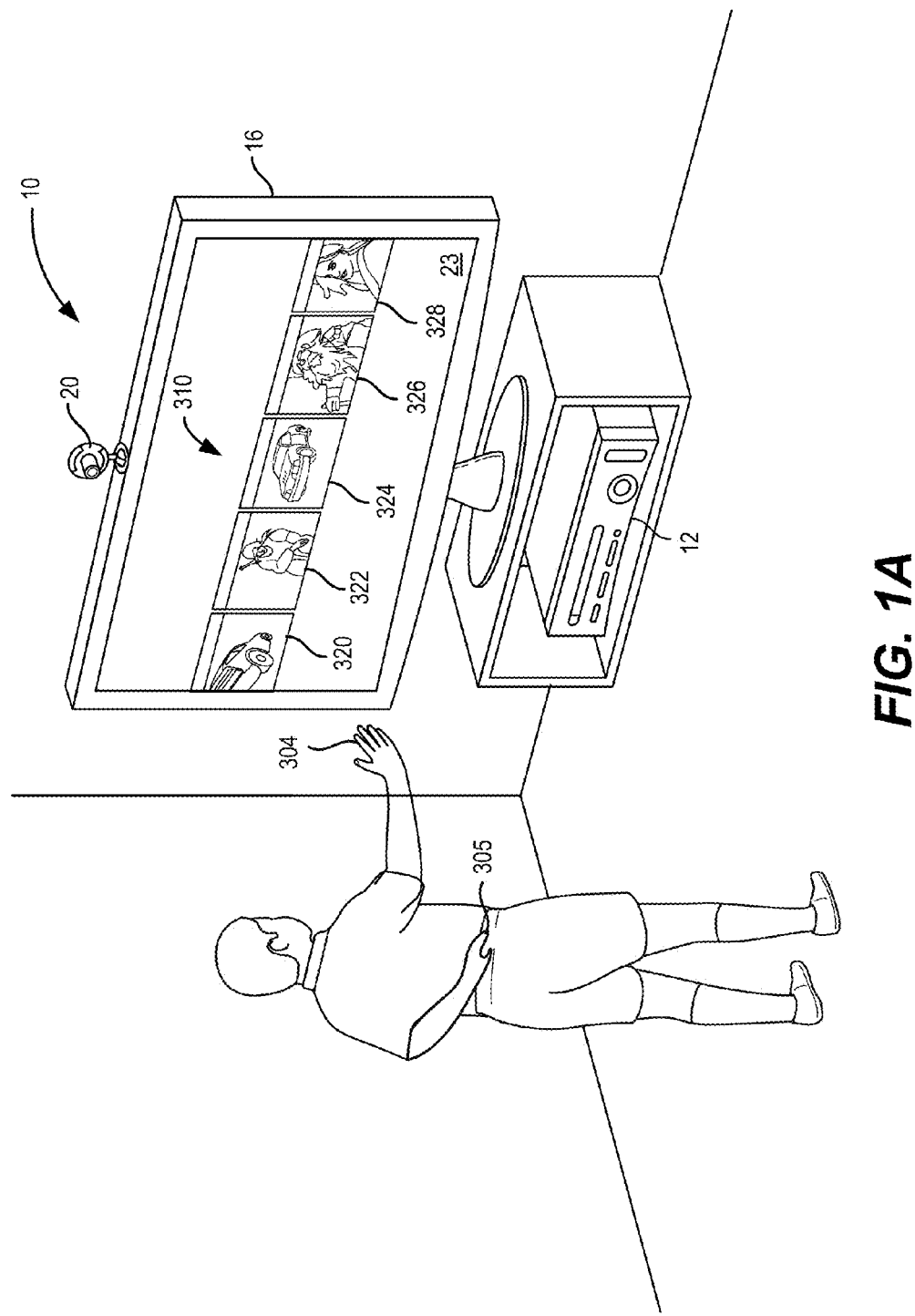

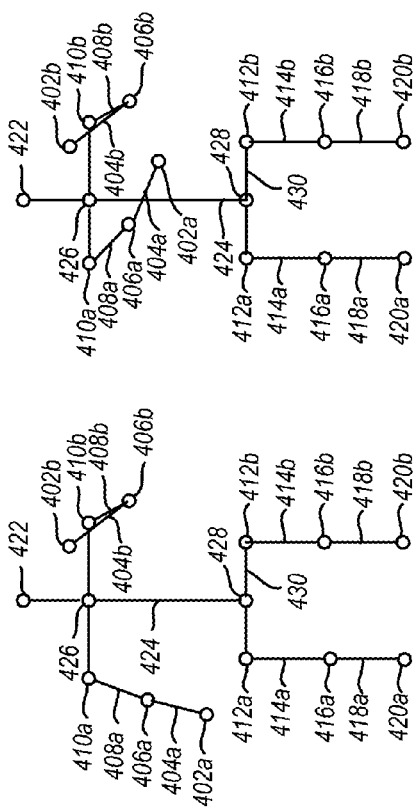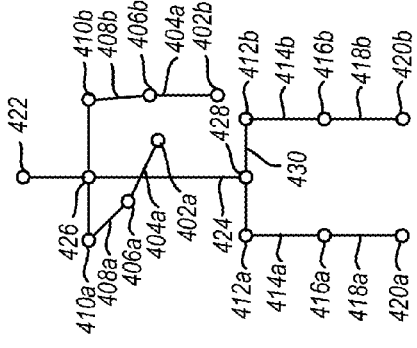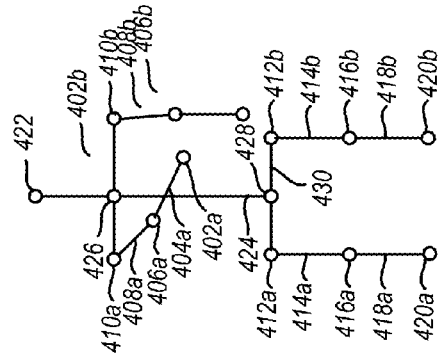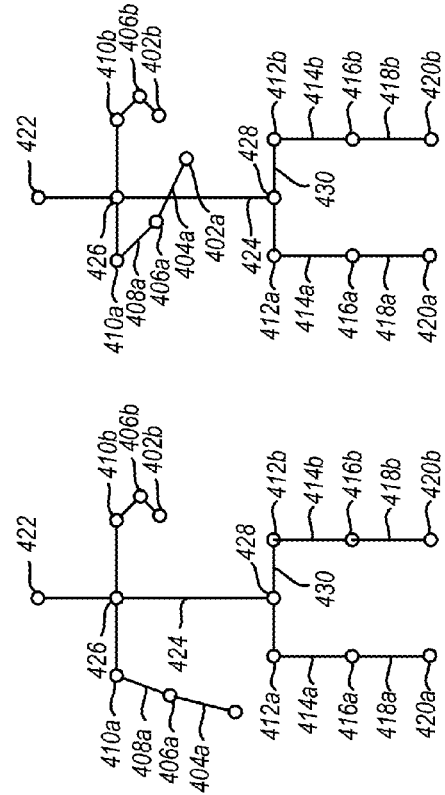

GESTURES AND GESTURE MODIFIERS FOR MANIPULATING A USER-INTERFACE

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition to provide a human computer interface ("HCI"). With HCI, user gestures are detected, interpreted and used to control game characters or other aspects of an application.

SUMMARY

A user-interface, such as that provided by an operating system or application of a general computing system or multimedia console, is controlled using symbolic gestures and gesture modifiers. Symbolic gesture movements in mid-air are performed by a user with or without the aid of an input device. A target tracking system analyzes these mid-air movements to determine when a pre-defined gesture has been performed. The tracking system further determines if a gesture modifier was present during at least a portion of performance of the symbolic gesture. When a gesture is detected without a gesture modifier, a first user-interface control action is performed. When a gesture is detected with a gesture modifier, a second user-interface action is performed. Gesture modifiers are also provided to aid in detecting when a gesture is performed by a user. A gesture modifier can indicate a gesture input period during which a user intends to perform a pre-defined gesture. The gesture input period can define a start and stop time for detecting a gesture input by the user.

A user-interface is controlled in one embodiment using mid-air movement of a human target. Movement of the human target is tracked using images from a capture device to generate a skeletal mapping of the human target. From the skeletal mapping, it is determined whether the movement of the human target satisfies one or more filters for a particular mid-air gesture. If the human target's movement satisfy the one or more filters, it is determined whether a modifier for the first mid-air gesture is present. If the movement of the human target satisfies the one or more filters and the modifier is not present, a first user-interface action corresponding to the mid-air gesture is performed. If the movement of the human target satisfies the one or more filters and the modifier is present, a second user-interface action corresponding to the mid-air gesture is performed.

In one embodiment, a system receives depth information of a capture area including a human target and creates a skeletal model for mapping movement of the human target over time. The system can detect a gesture modifier indicating a gesture period from the skeletal model or from other inputs such as physical objects or speech. In response to detecting the gesture modifier, the system determines from the skeletal model whether movement of the human target during the gesture period satisfies one or more filters for a first mid-air gesture. If the movement of the human target during the gesture period satisfies the one or more filters, the system performs a first user-interface action corresponding to the mid-air gesture.

In one embodiment, a method of operating a user-interface using mid-air motion of a human target includes tracking movement of the human target from a plurality of depth images using skeletal mapping of the human target in a known three-dimensional coordinate system. The method determines from the skeletal mapping whether movement including a first hand of the human target satisfies one or more filters for a first mid-air gesture and whether a second hand of the human target satisfies one or more filters for a modifier of the first mid-air gesture. If the first hand satisfies the first mid-air gesture filter(s) and the second hand satisfies the modifier filter(s), a first user-interface action is performed. If the first hand satisfies the first mid-air gesture filter(s) and the second hand does not satisfy the modifier filter(s), a second user-interface action is performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A and 1B illustrate one embodiment of a target recognition, analysis and tracking system with a user performing a gesture to control a user-interface.

FIGS. 9A-9C depict a skeletal mapping of a human target performing a horizontal fling gesture and gesture modifier in accordance with one embodiment.

FIGS. 10A-10C depict a skeletal mapping of a human target performing a horizontal fling gesture and gesture modifier in accordance with one embodiment.

DETAILED DESCRIPTION

Figure 1B:
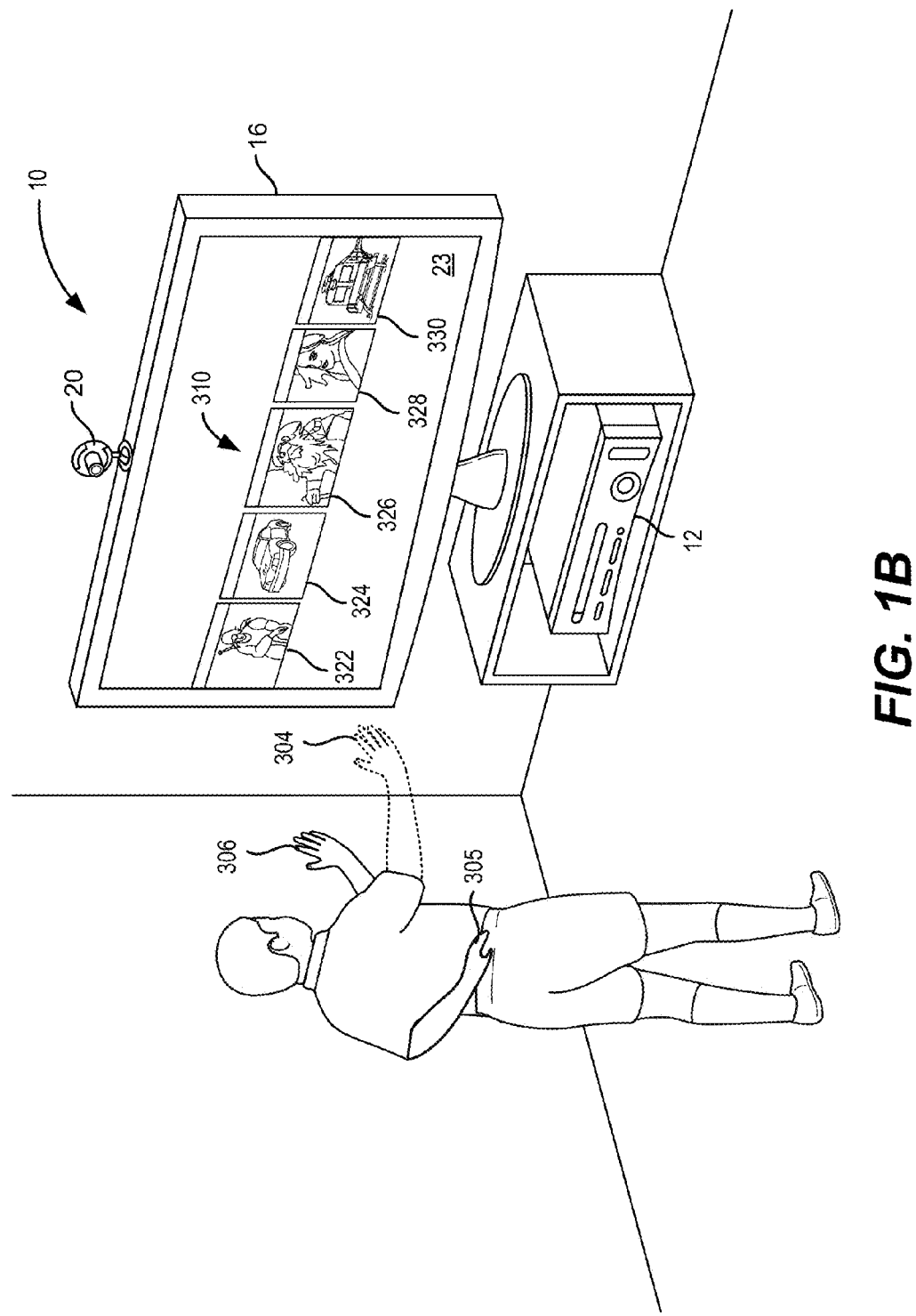

Gesture modifiers are provided for modifying and enhancing the control of a user-interface such as that provided by an operating system or application of a general computing system or multimedia console. Symbolic gesture movements are performed by a user in mid-air. A capture device generates depth images and a three-dimensional representation of a capture area including a human target. The human target is tracked using skeletal mapping to capture the mid-air motion of the user. Skeletal mapping data is used to identify movements corresponding to pre-defined gestures using gesture filters. Detection of a viable gesture can trigger one or more user-interface actions or controls. Gesture modifiers are provided to modify the user-interface action triggered by detection of a gesture and/or to aid in the identification of gestures. Gesture modifiers can be detected using skeletal mapping data and gesture modifier filters, or from other input provided by a user such as through use of a physical object or speech.

Gesture filters include parameters defining when a target's mid-air movement indicates a viable gesture. A gesture recognition engine analyzes the tracking data for a target to determine if a filter's parameters have been satisfied. If a viable gesture is detected, the gesture recognition engine returns to the operating system or application an indication that a gesture has been detected. The operating system or application uses the indication to control a user-interface, such as by performing one or more actions within the user-interface. These actions can include direct operating system controls, such as those provided in a menu-based UI system, or game-play actions in a multimedia gaming environment, for example.

A user can further provide and the system recognize gesture modifiers. A gesture modifier can modify a viable gesture to initiate a modification of the user-interface action performed by the system in response to detection of the viable gesture. If a gesture modifier is detected in addition to a viable gesture, the gesture recognition engine can return to an operating system or application an indication that the gesture modifier has been detected. The operating system or application can use the detection of a gesture modifier to perform a modified or different user-interface action in response to the detection of the viable gesture. Gesture modifiers can include a symbolic gesture performed by the user in addition to another symbolic gesture, as well as physical objects or speech provided by the user. Where the gesture modifier is a symbolic gesture, the gesture recognition engine can analyze the tracking data for a target to determine if a gesture modifier's filter has been satisfied.

A user can also provide and the system recognize a gesture modifier that provides input indicating when a target's mid-air movement is an intended gesture input, such as by defining a period in which to detect a viable gesture. The gesture recognition engine can use a gesture modifier that indicates an intended gesture input to aid in identifying the performance of a gesture by the human target. A gesture input period can specify a start time and end time defining a period during which the user's movement is intended to provide a gesture.

FIGS. 1A and 1B illustrate one embodiment of a target recognition, analysis and tracking system 10 (generally referred to as a tracking system hereinafter) with a user 18 interacting with a system user-interface 23. The target recognition, analysis and tracking system 10 may be used to recognize, analyze, and/or track a human target such as the user 18.

As shown in FIG. 1A, the tracking system 10 may include a computing environment 12. The computing environment 12 may be a computer, a gaming system or console, or the like. According to one embodiment, the computing environment 12 may include hardware components and/or software components such that the computing environment 12 may be used to execute an operating system and applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, the tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions for the user-interface of an operating system or application.

According to one embodiment, the tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis and tracking system 10 may be used to recognize, analyze, and/or track one or more human targets such as the user 18. For example, the user 18 may be tracked using the capture device 20 such that the movements of user 18 may be interpreted as controls that may be used to affect an application or operating system being executed by computer environment 12.

Consider a gaming application such as a boxing game executing on the computing environment 12. The computing environment 12 may use the audiovisual device 16 to provide a visual representation of a boxing opponent to the user 18 and the audiovisual device 16 to provide a visual representation of a player avatar that the user 18 may control with his or her movements. The user 18 may make movements (e.g., throwing a punch) in physical space to cause the player avatar to make a corresponding movement in game space. Movements of the user may be recognized and analyzed in physical space such that corresponding movements for game control of the player avatar in game space are performed.

Some movements may be interpreted as controls that may correspond to actions other than controlling a player avatar or other gaming object. For example, the player may use movements to end, pause, or save a game, select a level, view high scores, communicate with a friend, etc. Virtually any controllable aspect of an operating system and/or application may be controlled by movements of the target such as the user 18. The player may use movements to select a game or other application from a main user interface. A full range of motion of the user 18 may be available, used, and analyzed in any suitable manner to interact with an application or operating system.

In FIGS. 1A-1B user 18 is interacting with the tracking system 10 to control the system user-interface (UI) 23, which in this particular example is displaying a list 310 of menu items 320-328. The individual items may represent applications or other UI objects. A user may scroll left or right (as seen from the user's point of view) through the list 310 to view other menu items not in the current display but also associated with the list, select menu items to trigger an action such as opening an application represented by the menu item or further UI controls for that item. The user may also move backwards through the UI to a higher level menu item in the UI hierarchy.

The system may include gesture recognition, so that a user may control an application or operating system executing on the computing environment 12, which as discussed above may be a game console, a computer, or the like, by performing one or more gestures. In one embodiment, a gesture recognizer engine, the architecture of which is described more fully below, is used to determine from a skeletal model of a user when a particular gesture has been made by the user.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms in front of his torso. A gesture may also incorporate props, such as by swinging a mock sword. A gesture may comprise more than one body part, such as clapping the hands together, or a subtler motion, such as pursing one's lips.

For instance, various motions of the hands or other body parts may correspond to common system wide tasks such as to navigate up or down in a hierarchical menu structure, scroll items in a menu list, open a file, close a file, and save a file. Gestures may also be used in a video-game-specific context, depending on the game. For instance, with a driving game, various motions of the hands and feet may correspond to steering a vehicle in a direction, shifting gears, accelerating, and braking.

In FIGS. 1A-1B, the user performs a right-handed horizontal fling gesture to scroll the list of menu items to the left as seen from the user's point of view. The user begins with his right hand in position 304 as shown in FIG. 1A, then moves it to position 306 toward the left side of his body. The list 310 of menu items 320-328 is in a first position in FIG. 1A when the user begins the gesture with his hand at position 304. In FIG. 1B, the user has moved his hand to position 306, causing the list of menu items to change by scrolling the list 310 of menu items to the left. Menu item 320 has been removed from the list as a result of scrolling to the left (as defined in user's 18 point of view). Each of items 322-328 has moved one place to the left, replacing the position of the immediately preceding item. Item 330 has been added to the list, as a result of scrolling from the right to the left.

Although movement by a single space is depicted in this example, the horizontal fling gesture may cause movement of more than one item during a scrolling action. In one example, the velocity of the user's hand in moving from position 304 to 306 is determined and the list 310 of items scrolled in proportion to the determined velocity. In another example, the distance traveled by the user's hand in moving from position 304-306 is calculated and used to control an amount by the list of menu items is scrolled, with larger distances causing proportionally larger amounts of scrolling by the list of menu items.

Figure 2:
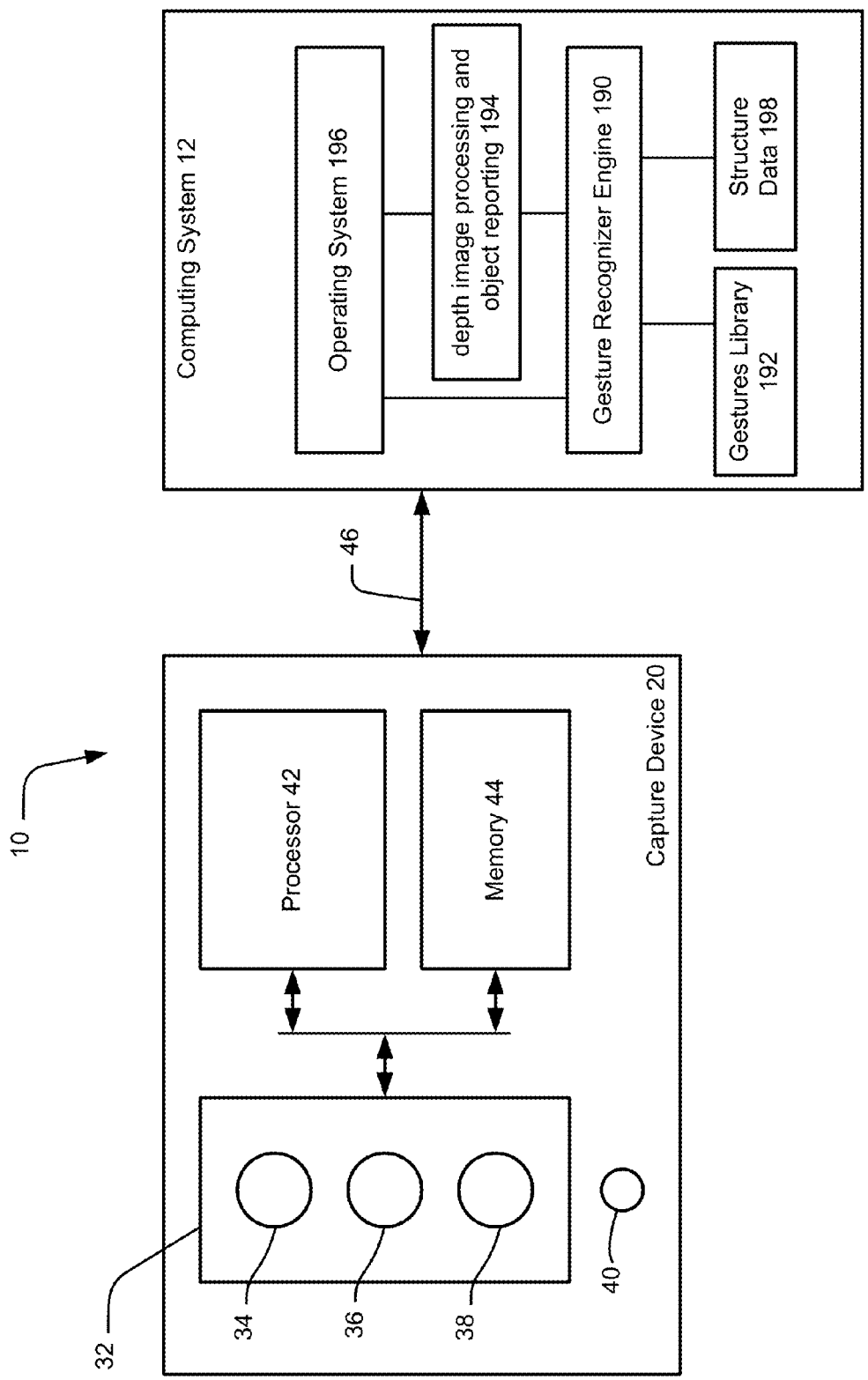
FIG. 2 illustrates one embodiment of a capture device that may be used as part of the tracking system.

FIG. 2 illustrates one embodiment of a capture device 20 and computing system 12 that may be used in the target recognition, analysis and tracking system 10 to recognize human and non-human targets in a capture area (without special sensing devices attached to the subjects), uniquely identify them and track them in three dimensional space. According to one embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. According to one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing environment 12 in the target recognition, analysis and tracking system 10. Additionally, the microphone 40 may be used to receive audio signals that may also be provided by the user to control applications such as game applications, non-game applications, or the like that may be executed by the computing environment 12.

In one embodiment, the capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing environment 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46.

The capture device 20 may provide the depth information and images captured by, for example, the 3-D camera 36 and/or the RGB camera 38, including a skeletal model that may be generated by the capture device 20, to the computing environment 12 via the communication link 46. The computing environment 12 may then use the skeletal model, depth information, and captured images to, for example, create a virtual screen, adapt the user interface and control an application such as a game or word processor.

Computing system 12 includes gestures library 192, structure data 198, gesture recognition engine 190, depth image processing and object reporting module 194 and operating system 196. Depth image processing and object reporting module 194 uses the depth images to track motion of objects, such as the user and other objects. The depth image processing and object reporting module 194 will report to operating system 196 an identification of each object detected and the location of the object for each frame. Operating system 196 will use that information to update the position or movement of an avatar or other images in the display or to perform an action on the provided user-interface. To assist in the tracking of the objects, depth image processing and object reporting module 194 uses gestures library 190, structure data 198 and gesture recognition engine 190.

Structure data 198 includes structural information about objects that may be tracked. For example, a skeletal model of a human may be stored to help understand movements of the user and recognize body parts. Structural information about inanimate objects may also be stored to help recognize those objects and help understand movement.

Gestures library 192 may include a collection of gesture filters, each comprising information concerning a gesture that may be performed by the skeletal model (as the user moves). A gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures. Those gestures may be associated with various controls of an application. Thus, the computing system 12 may use the gestures library 190 to interpret movements of the skeletal model and to control operating system 196 or an application (now shown) based on the movements.

Gestures library 192 may further include a collection of gesture modifier filters. Like gesture filters, the gesture modifier filters may include information defining a gesture modifier that may be performed by the skeletal model as the user moves. By comparing the skeletal model data from the capture device with the gesture modifier filters, the recognition engine may identify when the user has performed one or more gesture modifications. As earlier described, gesture modifiers may take the form of physical objects held or presented by the user, as well as speech commands. In these cases, the gesture modifier filters do not necessarily use user movements to identify when a gesture modifier has been performed. The filters may examine the images from capture device 20 to determine whether an object modifier is present. In some cases, this may include looking at the skeletal model to determine whether the physical object is in a defined space associated with the modifier. For example, a user holding a wand in their hand may be interpreted as a gesture modifier, while the mere presence of the wand in the capture device's field of view may not be interpreted as a gesture modifier. The engine may also analyze audio information from the capture device to determine whether a speech modifier has been issued.

Figure 3:
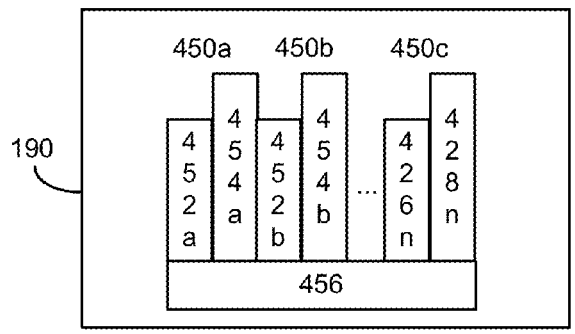
FIG. 3 is a block diagram describing one embodiment of a gesture recognition engine.

FIG. 3 provides further details of one exemplary embodiment of the gesture recognizer engine 190 of FIG. 2. As shown, the gesture recognizer engine 190 may comprise at least one filter 450 to determine a gesture or gestures. A filter 450 comprises parameters defining a gesture 452 (hereinafter referred to as a "gesture") along with metadata 454 for that gesture. A filter may comprise code and associated data that can recognize gestures or otherwise process depth, RGB, or skeletal data. Filters may be modular or interchangeable. The parameters 454 for the gesture 452 may vary between applications, between contexts of a single application, or within one context of one application over time. Gesture parameters may include threshold angles (e.g., hip-thigh angle, forearm-bicep angle, etc.), a number of periods where motion occurs or does not occur, a threshold period, threshold position (starting, ending), direction of movement, velocity, acceleration, coordination of movement, etc.

A filter may have a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for horizontal flinging that takes as input skeletal data and outputs a confidence that the gesture associated with the filter is occurring and a velocity of the hand in executing the gesture.

Inputs to a filter may comprise things such as joint data about a user's joint position, like angles formed by the bones that meet at the joint, RGB color data from the capture area, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 456 that provides functionality to a gesture filter 450. In an embodiment, the functionality that the base recognizer engine 456 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 450 are loaded and implemented on top of the base recognizer engine 456 and can utilize services provided by the engine 456 to all filters 450. In an embodiment, the base recognizer engine 456 processes received data to determine whether it meets the requirements of any filter 450. Since these provided services, such as parsing the input, are provided once by the base recognizer engine 456 rather than by each filter 450, such a service need only be processed once in a period of time as opposed to once per filter 450 for that period, so the processing required to determine gestures is reduced.

An application may use the filters 450 provided by the recognizer engine 190, or it may provide its own filter 450, which plugs in to the base recognizer engine 456. In an embodiment, all filters 450 have a common interface to enable this plug-in characteristic. Further, all filters 450 may utilize parameters 454, so a single gesture tool as described below may be used to debug and tune the entire filter system. These parameters 454 may be tuned for an application or a context of an application by a gesture tool.

There are a variety of outputs that may be associated with the gesture. In one example, there may be a baseline "yes or no" as to whether a gesture is occurring. In another example, there may be a confidence level, which corresponds to the likelihood that the user's tracked movement corresponds to the gesture. This could be a linear scale that ranges over floating point numbers between 0 and 1, inclusive. Where an application receiving this gesture information cannot accept false-positives as input, it may use only those recognized gestures that have a high confidence level, such as at least 0.95, for example. Where an application must recognize every instance of the gesture, even at the cost of false-positives, it may use gestures that have at least a much lower confidence level, such as those merely greater than 0.2, for example. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

A gesture or a portion thereof may have as a parameter a volume of space in which it must occur. This volume of space may typically be expressed in relation to the body where a gesture comprises body movement. For instance, a right-handed horizontal fling gesture may be recognized only in the volume of space no higher than the user's shoulders and no lower than the user's waist. It may not be necessary to define all bounds of a volume where an outer bound away from the body is left undefined, and the volume extends out indefinitely, or to the edge of capture area that is being monitored.

In general, the system will look for a number of continuous frames in which the user's movement matches that specified in the gesture filter. A running history of the target's motion will be examined for uninterrupted motion in accordance with the filter parameters. For example, if the movements indicated in FIGS. 1A-1B are interrupted by movement outside of the specified motion, the gesture filter may not be satisfied, even if the frames before and after the interruption match the movement specified in the filter. Where the capture system captures these positions by the user without any intervening position that may signal that the gesture is canceled or another gesture is being made, the tracking system may have the horizontal fling gesture output a high confidence level that the user made the horizontal fling gesture.

Turning to the horizontal fling gesture described in FIGS. 1A-1B for a specific example, it can be seen that the gesture comprises motion of the user's right hand from the right side of the user's body toward the left side of the body at a location some distance in front of the person's body. This gesture may be implemented as a gesture 452 comprising information representing the movement of one of the hands of the user from the side of the body corresponding to the hand to the opposite side of the body, as that movement would be captured by the depth camera. Parameters 454 may then be set for that gesture 452.

The gesture filter for the horizontal fling gesture depicted in FIGS. 1A-1B may set forth a number of rules defining its salient features that will be detected from motion by the user. First, the horizontal fling gesture may be defined as a handed gesture. A handed gesture is one in which the filter defines the gesture's performance as being made by a particular hand. The gesture filter in one example may specify that only movement by the right hand is to be considered for a right-handed fling gesture, such that movement by the left arm, hand, legs, torso and head, etc. can be ignored. The filter may specify that the only relevant mapping information to be examined is that of the hand in motion. Movement of the remainder of the target's body can be filtered or ignored, although other definitions of a horizontal fling gesture may specify some movement of other portions of the target's body, for example, that of the target's forearm or bicep. A left-handed fling gesture may comprise a filter defining that gesture as handed, such that movement by the left hand will be interpreted as a horizontal fling but movement by the right hand will not.

To detect a horizontal fling gesture, the gesture's filter may specify a starting position parameter, for example, a starting position of the target's hand relative to the target's body. Because the target may often be in relatively continuous motion, the gesture recognition engine may continuously look for the hand at the starting position, and then subsequent movement as detailed in FIGS. 1A-1B and specified in additional parameters described below.

The horizontal fling gesture filter may specify a distance parameter for the right hand. The distance parameter may require that the right hand move a threshold distance from the right side of the user's body to the left side of the user's body. In one example, the horizontal fling gesture filter will specify that vertical movements along the Y-axis are to be ignored. In another example, however, the horizontal fling gesture filter may specify a maximum distance that the right hand may traverse vertically so as to distinguish other horizontal movements that may involve a vertical component as well. In one example, the horizontal fling gesture filter further specifies a minimum velocity parameter, requiring that the hand meet a specified velocity in its movement from the right side of the user's body to the left side of the user's body. In another example, the gesture filter can specify a time parameter, requiring that the hand travel the threshold distance within a maximum amount of time.

The horizontal fling gesture filter may include metadata that specifies velocity ranges of the hand in performing the horizontal fling gesture. The computing environment can use the velocity of the hand in traveling towards the left side of the body to determine an amount by which the system will respond to the fling gesture. For example, if the fling gesture is being used to scroll items horizontally on a list, the items may scroll more quickly in response to higher velocity movements and more slowly in response to slower velocity movements. In addition to or alternatively, the metadata can specify velocity ranges whereby the number of items scrolled is increased based on higher velocity gesture movement and decreased for lower velocity gesture movement.

The horizontal fling gesture filter may also include metadata that specifies distance ranges of the hand in performing the horizontal fling gesture. The computing environment can use the distance traveled by the hand to determine an amount by which the system will respond to the fling gesture. For example, if the fling gesture is being used to scroll items horizontally on a list, the list may scroll by a larger amount in response to larger distances traveled by the hand and by a smaller amount in response to smaller distances traveled by the hand.

More information about recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

Gestures for user-interface control in one embodiment include, but are not limited to, the aforementioned horizontal fling gesture, a vertical fling gesture, a press gesture, a back gesture, a circular wheel gesture, a wave gesture, a two-handed press gesture, a two-handed back gesture, a two-handed compression gesture and a two-handed reverse compression gesture. A vertical fling gesture generally includes a vertical hand movement and can trigger a vertical menu item scrolling action by the user interface. A press gesture generally includes a hand movement away from a user's body and toward a capture device, triggering the selection of one or more menu items provided by the user-interface. A back gesture generally includes a hand movement toward a user's body and away from the capture device, triggering backwards navigation through the user-interface, such as from a lower level to a higher level in a menu hierarchy provided by the user-interface. A wave gesture generally includes a horizontal hand movement with a vertical component that defines an arc as the user moves their hand across their body. A wave gesture can begin a gesture input period in one example. A circular wheel gesture generally includes a user making circular movement in front of their body, triggering navigation through a list of menu items. A two-handed press gesture generally includes movement by both hands away from a target's body and toward the capture device, triggering backwards navigation through the user-interface. A two-handed press gesture may also or alternatively trigger a zoom function to zoom out of the current user-interface display. A two-handed compression gesture generally includes a target bringing their hands together in front of their body, triggering a zoom function to zoom out of the current user-interface display. A two-handed compression gesture may also trigger backwards navigation through the user-interface's menu hierarchy. A two-handed compression gesture may further trigger a special operation at the culmination of the movement, such as to collapse a current interface display or to open a menu item in the current display. A two-handed reverse compression gesture generally includes a target beginning with their hands together in front of their body, followed by separating or pulling their hands apart. A two-handed reverse compression gesture may trigger a zoom function to zoom in on the current user-interface view or to navigate forward through the user-interface menu hierarchy. More details regarding symbolic gestures for user-interface control can be found in U.S. patent application Ser. No. 12/782,377, "Gestures and Gesture Recognition for Manipulating a User Interface," filed concurrently, incorporated by reference herein in its entirety.

Figure 4:
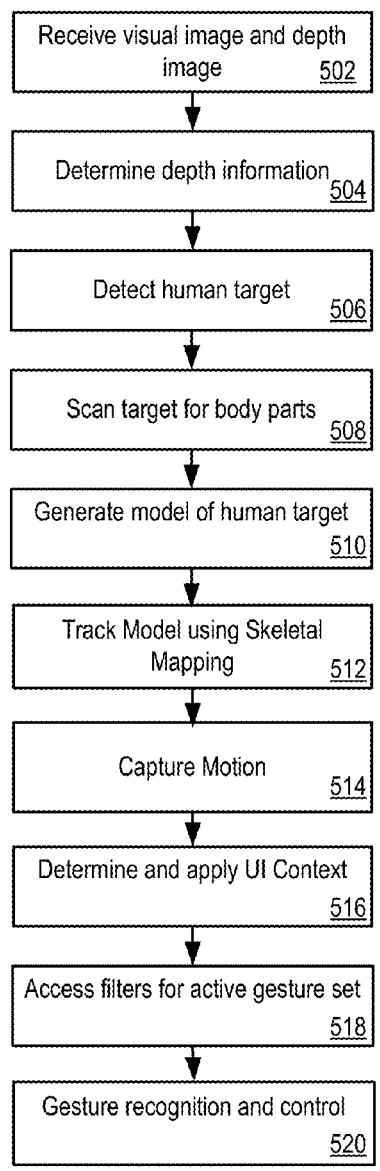
FIG. 4 is a flowchart describing one embodiment of a process for gesture control of a user interface.

FIG. 4 is a flowchart describing one embodiment of a process for gesture control of a user interface as can be performed by tracking system 10 in one embodiment. At step 502, processor 42 of the capture device 20 receives a visual image and depth image from the image capture component 32. In other examples, only a depth image is received at step 502. The depth image and visual image can be captured by any of the sensors in image capture component 32 or other suitable sensors as are known in the art. In one embodiment the depth image is captured separately from the visual image. In some implementations the depth image and visual image are captured at the same time while in others they are captured sequentially or at different times. In other embodiments the depth image is captured with the visual image or combined with the visual image as one image file so that each pixel has an R value, a G value, a B value and a Z value (representing distance).

At step 504 depth information corresponding to the visual image and depth image are determined. The visual image and depth image received at step 502 can be analyzed to determine depth values for one or more targets within the image. Capture device 20 may capture or observe a capture area that may include one or more targets. At step 506, the capture device determines whether the depth image includes a human target. In one example, each target in the depth image may be flood filled and compared to a pattern to determine whether the depth image includes a human target. In one example, the edges of each target in the captured scene of the depth image may be determined. The depth image may include a two dimensional pixel area of the captured scene for each pixel in the 2D pixel area may represent a depth value such as a length or distance for example as can be measured from the camera. The edges may be determined by comparing various depth values associated with for example adjacent or nearby pixels of the depth image. If the various depth values being compared are greater than a pre-determined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or a physical object in the capture area.

At step 508, the capture device scans the human target for one or more body parts. The human target can be scanned to provide measurements such as length, width or the like that are associated with one or more body parts of a user, such that an accurate model of the user may be generated based on these measurements. In one example, the human target is isolated and a bit mask is created to scan for the one or more body parts. The bit mask may be created for example by flood filling the human target such that the human target is separated from other targets or objects in the capture area elements. At step 510 a model of the human target is generated based on the scan performed at step 508. The bit mask may be analyzed for the one or more body parts to generate a model such as a skeletal model, a mesh human model or the like of the human target. For example, measurement values determined by the scanned bit mask may be used to define one or more joints in the skeletal model. The bitmask may include values of the human target along an X, Y and Z-axis. The one or more joints may be used to define one or more bones that may correspond to a body part of the human.

According to one embodiment, to determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human.

In another embodiment, to determine the location of the shoulders, the bitmask may be parsed downward a certain distance from the head. For example, the top of the bitmask that may be associated with the top of the head may have an X value associated therewith. A stored value associated with the typical distance from the top of the head to the top of the shoulders of a human body may then added to the X value of the top of the head to determine the X value of the shoulders. Thus, in one embodiment, a stored value may be added to the X value associated with the top of the head to determine the X value associated with the shoulders.

In one embodiment, some body parts such as legs, feet, or the like may be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

According to one embodiment, upon determining the values of, for example, a body part, a data structure may be created that may include measurement values such as length, width, or the like of the body part associated with the scan of the bitmask of the human target. In one embodiment, the data structure may include scan results averaged from a plurality depth images. For example, the capture device may capture a capture area in frames, each including a depth image. The depth image of each frame may be analyzed to determine whether a human target may be included as described above. If the depth image of a frame includes a human target, a bitmask of the human target of the depth image associated with the frame may be scanned for one or more body parts. The determined value of a body part for each frame may then be averaged such that the data structure may include average measurement values such as length, width, or the like of the body part associated with the scans of each frame. In one embodiment, the measurement values of the determined body parts may be adjusted such as scaled up, scaled down, or the like such that measurements values in the data structure more closely correspond to a typical model of a human body. Measurement values determined by the scanned bitmask may be used to define one or more joints in a skeletal model at step 510.

At step 512 the model created in step 510 is tracked using skeletal mapping. For example, the skeletal model of the user 18 may be adjusted and updated as the user moves in physical space in front of the camera within the field of view. Information from the capture device may be used to adjust the model so that the skeletal model accurately represents the user. In one example this is accomplished by one or more forces applied to one or more force receiving aspects of the skeletal model to adjust the skeletal model into a pose that more closely corresponds to the pose of the human target and physical space. At step 514 motion is captured from the depth images and visual images received from the capture device. In one embodiment capturing motion at step 514 includes generating a motion capture file based on the skeletal mapping as will be described in more detail hereinafter.

At step 516 a user interface context is determined and applied. The UI context may be an environmental context referring to the different environments presented by computing environment 12. For example, there may be a different context among different environments of a single application running on computer device 12. For example, a first person shooter game may involve operating a motor vehicle which corresponds to a first context. The game may also involve controlling a game character on foot which may correspond to a second context. While operating the vehicle in the first context, movements or gestures may represent a first function or first set of functions while in the second context of being on foot those same motions or gestures may represent different functions. For example, extending the first in front and away from the body while in a foot context may represent a punch, while in the driving context the same motion may represent a gear shifting gesture. Further, the context may correspond to one or more menu environments where the user can save a game, select among character equipment or perform similar actions that do not comprise direct game play. In that environment or context, the same gesture may have a third meaning such as to select something or to advance to another screen or to go back from a current screen or to zoom in or zoom out on the current screen. Step 516 can include determining and applying more than one UI context. For example, where two users are interfacing with the capture device and computing environment, the UI context may include a first context for a first user and a second context for the second user. In this example, context can include a role played by the user such as where one user is a driver and another user is a shooter for example.

At step 518 the gesture filters for the active gesture set are determined. Step 518 can be performed based on the UI context or contexts determined in step 516. For example, a first set of gestures may be active when operating in a menu context while a different set of gestures may be active while operating in a game play context. Step 518 can also include determining an active set of gesture modifiers and the filters for those modifiers. At step 520 gesture recognition and control is performed. The tracking model and captured motion are passed through the filters for the active gesture set to determine whether any active gesture filters are satisfied. Any detected gestures are applied within the computing environment to control the user interface provided by computing environment 12. Step 520 can further include determining whether any gesture modifiers are present and if so, modifying the user-interface action that is performed in response to gesture detection.

In one embodiment, steps 516-520 are performed by computing device 12. Furthermore, although steps 502-514 are described as being performed by capture device 20, various ones of these steps may be performed by other components, such as by computing environment 12. For example, the capture device 20 may provide the visual and/or depth images to the computing environment 12 which will in turn, determine depth information, detect the human target, scan the target, generate and track the model and capture motion of the human target.

Figure 5:
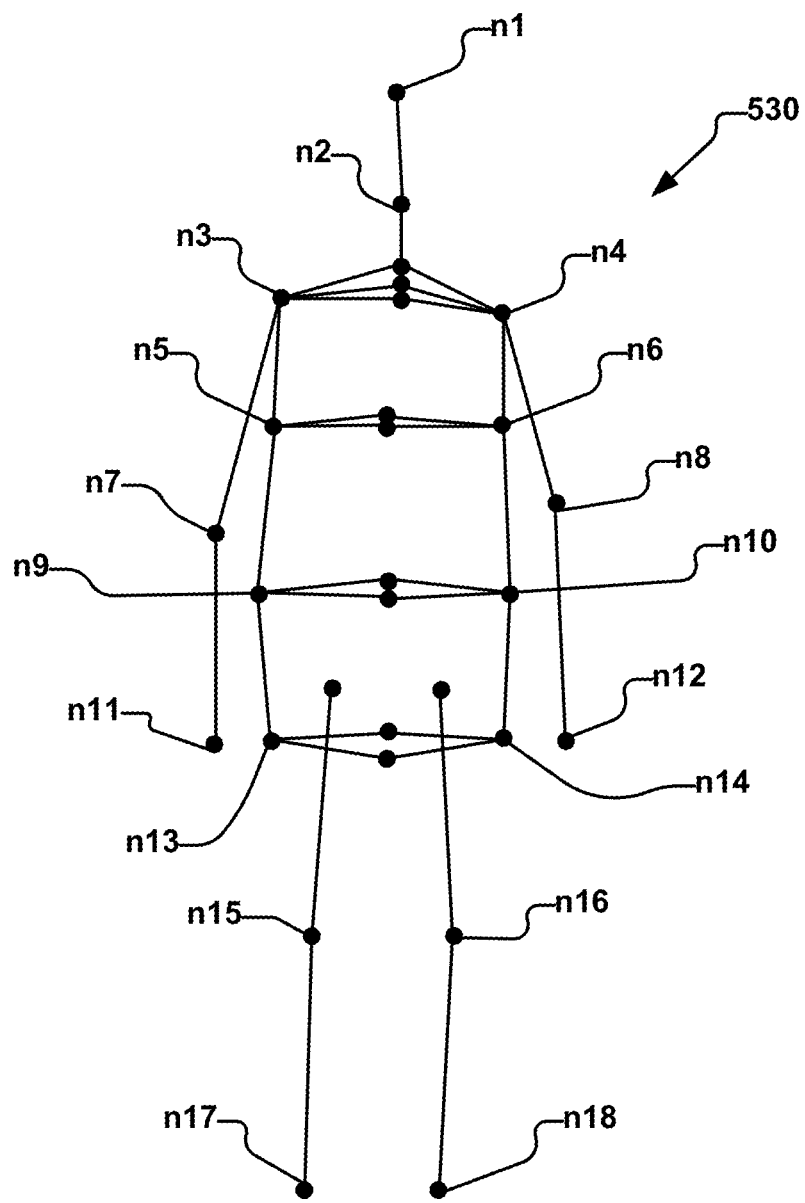
FIG. 5 is an example of a skeletal model of a human target that can be generated by a tracking system in one embodiment.

FIG. 5 illustrates an example of a skeletal model or mapping 530 representing a scanned human target that may be generated at step 510 of FIG. 4. According to one embodiment, the skeletal model 530 may include one or more data structures that may represent a human target as a three-dimensional model. Each body part may be characterized as a mathematical vector defining joints and bones of the skeletal model 530.

Skeletal model 530 includes joints n1-n18. Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 6:
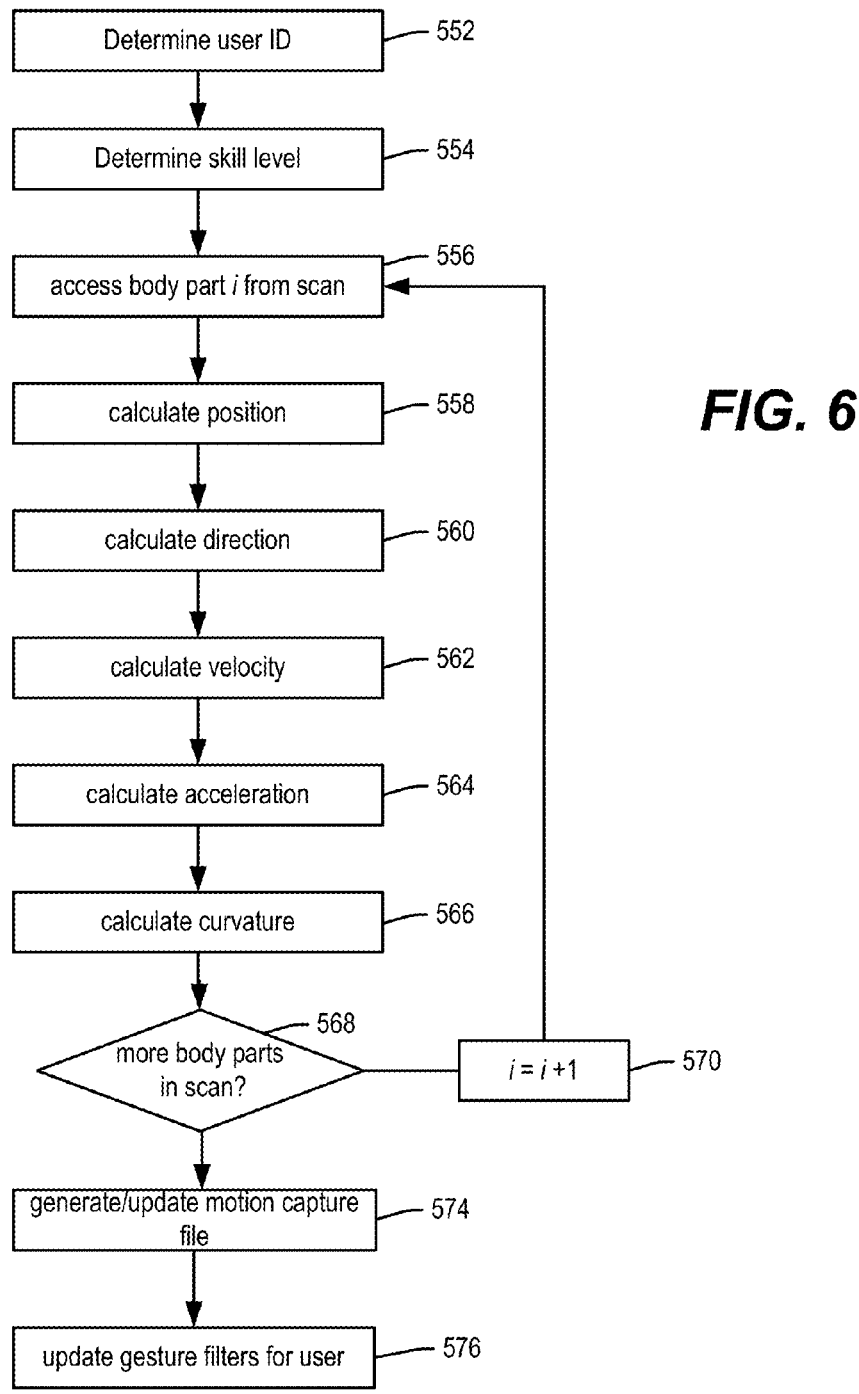
FIG. 6 is a flowchart describing one embodiment of a process for capturing motion to control a user interface.

FIG. 6 is a flowchart describing one embodiment of a process for capturing motion using one or more capture devices including depth cameras, and tracking a target within the capture device's field of view for controlling a user interface. FIG. 6 provides more detail for tracking a model and capturing motion as performed at steps 512 and 514 of FIG. 5 in one example.

At step 552 a user identity of a human target in the field of view is determined. Step 552 is optional. In one example, step 552 can use facial recognition to correlate the user's face from a received visual image with a reference visual image. In another example, determining the user I.D. can include receiving input from the user identifying their I.D. For example, a user profile may be stored by computer environment 12 and the user may make an on screen selection to identify themselves as corresponding to that user profile. Other examples for determining an I.D. of a user can be used. At step 554 the skill level of the identified user is determined. Step 554 is optional. In one example, determining the skill level includes accessing a skill level stored with the user profile in the computing environment. In another example, step 554 is performed dynamically by examining the user's interaction with the computing environment. For example, by analyzing the user's movements, gestures and ability to control an application or the user interface may be used to establish a skill level. This process can be dynamic and updated regularly or continuously as the user interacts with the system. In one example, a user's identity and skill level can be used to adjust gesture filters as will be described hereinafter.

To track the user's motion, skeletal mapping of the target's body parts is utilized. At step 556 a body part i resulting from scanning the human target and generating a model at steps 508 and 510 is accessed. At step 558 the position of the body part is calculated in X,Y, Z space to create a three dimensional positional representation of the body part within the field of view of the camera. At step 560 a direction of movement of the body part is calculated, dependent upon the position. The directional movement may have components in any one of or a combination of the X, Y, and Z directions. In step 562 the body part's velocity of movement is determined. At step 564 the body parts acceleration is calculated. At step 566 the curvature of the body parts movement in the X, Y, Z space is determined, for example, to represent non-linear movement within the capture area by the body part. The velocity, acceleration and curvature calculations are not dependent upon the direction. It is noted that steps 558 through 566 are but an example of calculations that may be performed for skeletal mapping of the user's movement. In other embodiments, additional calculations may be performed or less than all of the calculations illustrated in FIG. 6 can be performed. In step 568 the tracking system determines whether there are more body parts identified by the scan at step 508. If there are additional body parts in the scan, i is set to i+1 at step 570 and the method returns to step 556 to access the next body part from the scanned image. The use of X, Y, Z Cartesian mapping is provided only as an example. In other embodiments, different coordinate mapping systems can be used to calculate movement, velocity and acceleration. A spherical coordinate mapping, for example, may be useful when examining the movement of body parts which naturally rotate around joints.

Once all body parts in the scan have been analyzed as determined at step 570, a motion capture file is generated or updated for the target at step 574. The target recognition analysis and tracking system may render and store a motion capture file that can include one or more motions such as a gesture motion. In one example, the motion capture file is generated in real time based on information associated with the tracked model. For example, in one embodiment the motion capture file may include the vectors including X, Y, and Z values that define the joints and bones of the model as it is being tracked at various points in time. As described above, the model being tracked may be adjusted based on user motions at various points in time and a motion capture file of the model for the motion may be generated and stored. The motion capture file may capture the tracked model during natural movement by the user interacting with the target recognition analysis and tracking system. For example, the motion capture file may be generated such that the motion capture file may naturally capture any movement or motion by the user during interaction with the target recognition analysis and tracking system. The motion capture file may include frames corresponding to, for example, a snapshot of the motion of the user at different points in time. Upon capturing the tracked model, information associated with the model including any movements or adjustment applied thereto at a particular point in time may be rendered in a frame of the motion capture file. The information in the frame may include for example the vectors including the X, Y, and Z values that define the joints and bones of the tracked model and a time stamp that may be indicative of a point in time in which for example the user performed the movement corresponding to the pose of the tracked model.

In step 576 the system adjusts the gesture settings for the particular user being tracked and modeled, if warranted. The gesture settings can be adjusted based on the information determined at steps 552 and 554 as well as the information obtained for the body parts and skeletal mapping performed at steps 556 through 566. In one particular example, if a user is having difficulty completing one or more gestures, the system can recognize this for example, by parameters nearing but not meeting the threshold requirements for the gesture recognition. In such a case, adjusting the gesture settings can include relaxing the constraints for performing the gesture as identified in one or more gesture filters for the particular gesture. Similarly, if a user demonstrates a high level of skill, the gesture filters may be adjusted to constrain the movement to more precise renditions so that false positives can be avoided. In other words, by tightening the constraints of a skilled user, it will be less likely that the system will misidentify a movement as a gesture when no gesture was intended.

The system may apply pre-determined actions to the user-interface based on one or more motions of the tracked model that satisfy one or more gesture filters. The joints and bones in the model captured in the motion capture file may be mapped to particular portions of the game character or avatar. For example, the joint associated with the right elbow may be mapped to the right elbow of the avatar or game character. The right elbow may then be animated to mimic the motions of the right elbow associated with the model of the user in each frame of the motion capture file, or the right elbow's movement may be passed to a gesture filter to determine if the corresponding constraints have been satisfied.

According to one example, the tracking system may apply the one or more motions as the motions are captured in the motion capture file. Thus, when a frame is rendered in the motion capture file, the motions captured in the frame may be applied to the avatar, game character or user-interface such that the avatar or game character may be animated to immediately mimic the motions captured in the frame. Similarly, the system may apply the UI actions as the motions are determined to satisfy one or more gesture filters.

In another embodiment, the tracking system may apply the one or more motions after the motions are captured in a motion capture file. For example, a motion such as a walking motion or a motion such as a press or fling gesture, described below, may be performed by the user and captured and stored in the motion capture file. The motion may then be applied to the avatar, game character or user interface each time, for example, the user subsequently performs a gesture recognized as a control associated with the motion such as the walking motion or press gesture.

Figure 7:
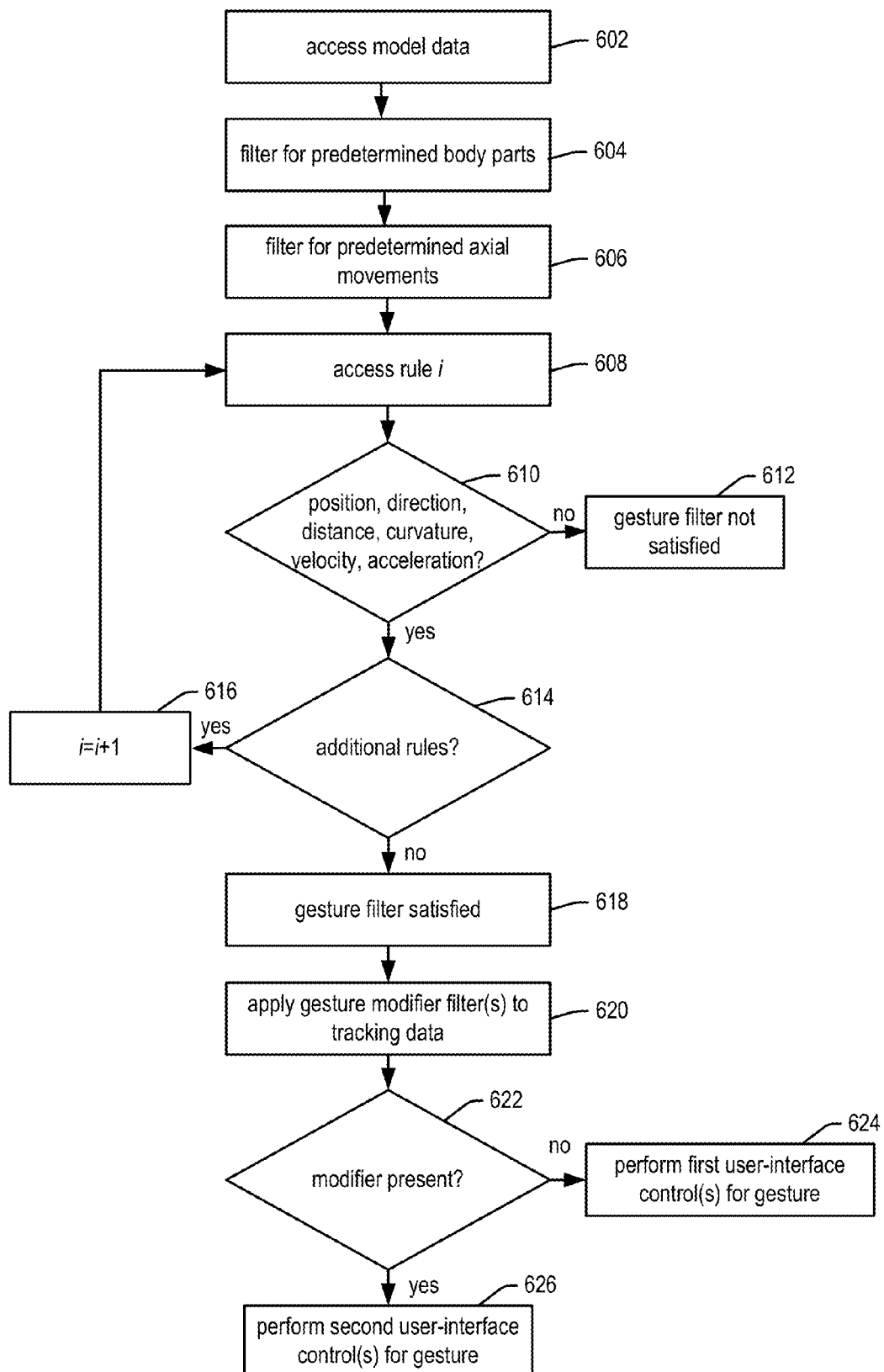
FIG. 7 is a flowchart describing one embodiment of a process for gesture recognition and control using gesture modifiers in accordance with one embodiment.

FIG. 7 is a flowchart describing one embodiment of a process for gesture recognition and control in accordance with an embodiment of the present disclosure. FIG. 7 describes a rule based approach where the gesture recognition engine 190 utilizes one or more gesture filters to determine whether a gesture is satisfied and one or more gesture modification filters to determine the resulting action to be performed for the user interface or other application. It will be appreciated that the process of FIG. 7 may be performed multiple times to detect multiple gestures in the active gesture set, although detection of a single gesture is described in the particular example. The described process may be performed in parallel or in sequence for multiple active gestures.

At step 602, the gesture recognition engine accesses the skeletal tracking data for a particular target to begin determining whether that target has performed a selected gesture. The skeletal tracking data can be accessed from a motion capture file in one example. At step 604, the gesture recognition engine filters the skeletal tracking data for one or more predetermined body parts pertinent to the selected gesture as identified in the selected gesture filter. Step 604 can include accessing only that data which is pertinent to the selected gesture, or accessing all skeletal tracking data for the target and ignoring or discarding information not pertinent to the selected gesture. For example, a horizontal fling gesture filter may indicate that only a human target's hand is pertinent to the selected gesture so that data pertaining to other body parts can be ignored. Such a technique can increase the performance of the gesture recognition engine by limiting processing to that information predetermined to be salient to the selected gesture.

At step 606, the gesture recognition engine filters the skeletal tracking data for predetermined axial movements. The selected gesture's filter may specify that only movements along a subset of axes are relevant. Consider a vertical fling gesture as will be described in more detail hereinafter in which a user moves their hand up or down in the vertical direction to control the user interface. The gesture filter for the vertical fling gesture may specify that the only relevant axial movement is that along the vertical Y-axis and that movements along the horizontal X-axis and the depth Z-axis are not relevant. Thus, step 606 can include accessing the skeletal tracking data for a target's hand movement in the vertical Y-axis direction and ignoring or discarding data pertaining to the hand's movement in the X-axis or Z-axis direction. It is noted that in other examples a vertical fling gesture filter may specify examination of a hand's movement in other directions as well. For example, horizontal X-axis movements may be analyzed to determine which item(s) on the screen are to be manipulated by the vertical fling gesture or to differentiate a vertical fling gesture from other movements.

At step 608, the gesture recognition engine accesses a rule i specified in the gesture filter. In the first iteration through the process of FIG. 7, i is equal to 1. A gesture may include a plurality of parameters that need to be satisfied in order for the gesture to be recognized. Each of these parameters can be specified in a separate rule, although multiple parameters can be included in a single rule. A rule may specify a threshold distance, position, direction, curvature, velocity and/or acceleration, among other parameters, that a target's body part must meet in order for the gesture to be satisfied. A rule may apply to one body part or multiple body parts. Moreover, a rule may specify a single parameter such as position or multiple parameters such as position, direction, distance, curvature, velocity and acceleration.

At step 610, the gesture recognition engine compares the skeletal tracking data filtered at steps 604 and 606 with the specified parameter(s) of the rule to determine whether the rule is satisfied. For example, the gesture recognition engine may determine whether a hand's starting position was within a threshold distance of a starting position parameter. Detecting the beginning of a gesture in one example includes determining if a user's body is moved to a specific starting position, determining whether the user's hand is extended a particular distance away from the body, whether the hand and/or body maintains a particular position for a period of time, whether the hand maintains a particular acceleration for a period of time, (e.g., to detect circular motions), and whether the hand's velocity in a particular direction crosses a particular threshold. Any one or a combination of these criteria can be used. The rule may further specify and the engine determine whether the hand: moved in a specified direction; moved a threshold distance from the starting position in the specified direction; moved within a threshold curvature along a specified axis; moved at or above a specified velocity; reached or exceeded a specified acceleration. Similar criteria to that used for detecting the beginning of a gesture can be used to detect the completion of a gesture. For example, a position of the hand and whether the hand maintains a particular position for a period of time can be used. If the engine determines that the skeletal tracking information does not meet the parameters specified in the filter rule, no user-interface action is taken as specified at step 612. In one embodiment at step 612, the gesture recognition engine returns a fail or gesture filter not satisfied response at to operating system 196 or an application executing on computing system 12.

At step 614 the gesture recognition engine determines whether the gesture filter specifies additional rules that must be met for the gesture to be completed. If additional rules are included in the filter, i is incremented by one and the process returns to step 608 where the next rule is accessed. If no additional rules are included in the filter for the selected gesture, the engine concludes at step 618 that the gesture filter has been satisfied. Step 618 can include returning an indication to the operating system or application that the gesture has been detected in one embodiment.

At step 620, the gesture recognition engine determines whether a gesture modifier was present for the detected gesture. In one embodiment, a gesture modifier is a symbolic gesture provided by the user in addition to the detected gesture. A user may form a pose or perform a movement in addition that of a main gesture to indicate a modification of the main gesture. By way of example, a user may raise their left hand to form a modifier to a gesture performed by their right hand or other body part. Similarly, a user may raise their right hand to form a modifier to a gesture performed by their left hand or other body part. Other movements and poses by the human target are contemplated as suitable gesture modifiers. Furthermore, gesture modifiers are not limited to poses and movements by the human target. For example, other gesture modifiers may include, but are not limited to physical objects, sounds or electromechanical input. Multiple modifiers may apply simultaneously to a particular gesture to evaluate which of several user interface actions to perform. Thus, step 620 can include applying filters for more than one gesture modifier. By way of example, a user may provide both a gesture and speech modifier to a gesture. Additionally, multiple modifiers may be applied in sequence, such as to modify a gesture or pose that is held over a period of time.

If no modifier is present for the detected gesture as determined at step 622, a first user-interface action is performed at step 624. If a modifier is present for the detected gesture, a second user-interface action is performed at step 626. In one embodiment, the second UI action performed at step 626 is a modified form of the first UI action performed at step 624, although this is not required. Consider the horizontal fling gesture as earlier described in FIGS. 1A-1B. In FIG. 1B, the user's movement triggers a user-interface action that scrolls a list 310 of menu items on the user-interface from right to left from the user's point of view. By supplying a modifier when making the horizontal fling gesture, a modified form of the scrolling action can be performed. For example, unmodified scrolling may be performed at a first rate while the modified scrolling can be performed at a second rate, such as by moving more items when the modifier hand is detected.

Steps 612 and 618 of FIG. 7 are described as a simple pass/fail determination for the gesture being analyzed. In other examples, rather than return a simple pass/fail response, steps 612 and 618 can return a confidence level that a gesture's filter was satisfied. For each rule in the filter, an amount by which the target's movement meets or does not meet a specified parameter is determined. Based on an aggregation of these amounts, the recognition engine returns a confidence level that the gesture was indeed performed by the target. Steps 624 and 626 can include similar responses indicating whether a gesture modification was detected. The gesture recognition engine may return to the operating system or other application a confidence level that a particular gesture was performed.

Figure 8:
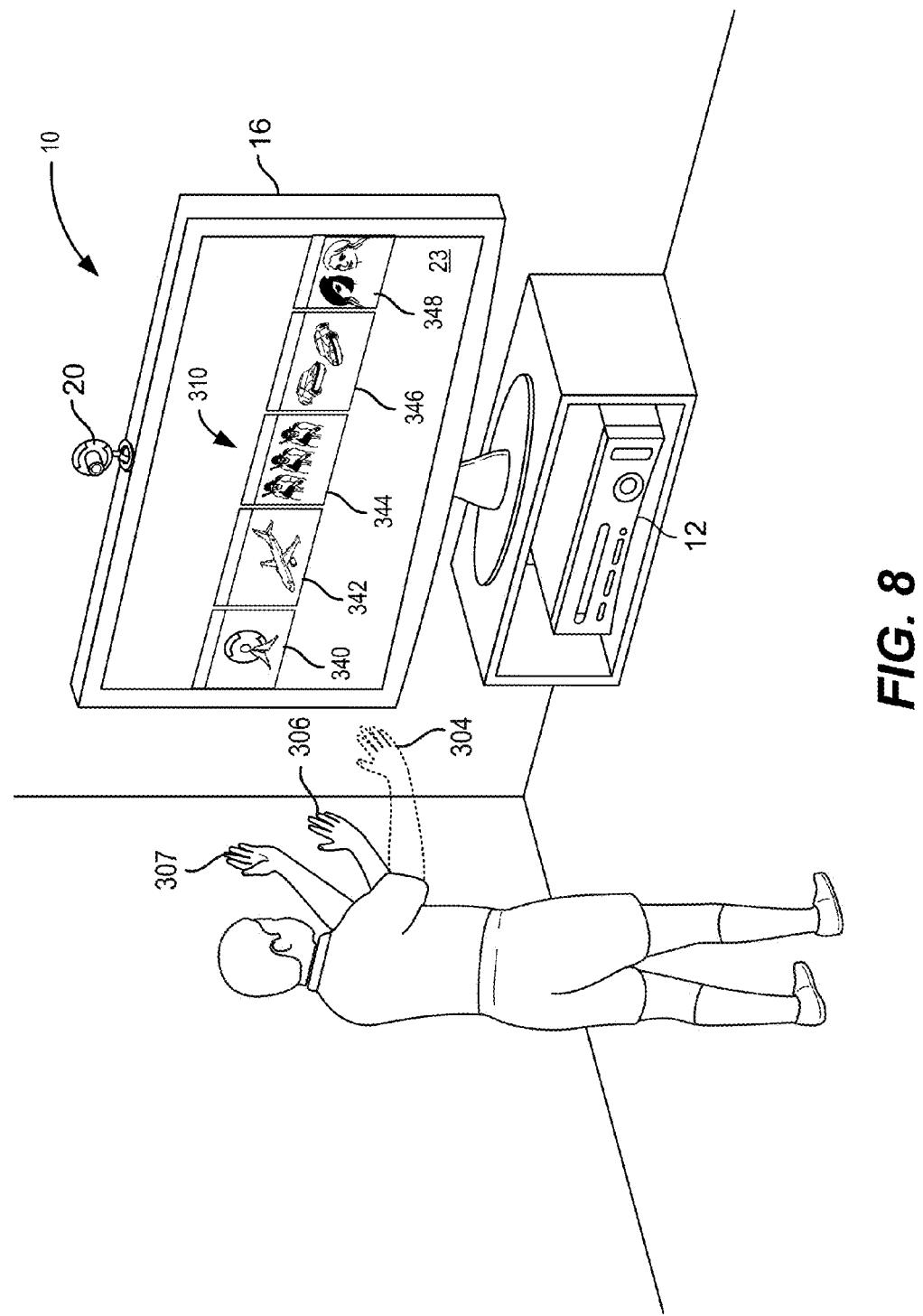
FIG. 8 illustrates one embodiment of a target recognition, analysis and tracking system with a user performing a gesture and gesture modifier to control a user-interface.

FIG. 8 depicts the user 18 interacting with system 10 to perform the same horizontal fling gesture as shown in FIGS. 1A-1B, but while also supplying a modifier to the horizontal fling gesture. FIG. 8 corresponds to the system view at the completion of the gesture as shown in FIG. 1B. In this particular example, the gesture modifier is a hand modifier defined by a location of the hand opposite to the gesture hand when the user performs the fling gesture. As shown in FIG. 8, user 18 raises his left hand from its position 305 in FIG. 1A to position 307 in FIG. 8. The user may raise their left hand before performing the fling gesture, or may raise it at some time after beginning the gesture to provide the modifier input.

Capture device 20 determines that the gesture modifier has been provided and provides an indication of the modifier to system 12. System 12 causes a second control action for UI 23 to be performed as depicted in FIG. 8. In this example, the modifier causes the list 310 of menu items to scroll by a page rather than by a single menu item as for the unmodified fling gesture. A list of menu items may be organized into pages, with a page being the menu items displayed at any given time. Menu items 320-328 scroll off the display and are replaced by menu items 340-348. Other modifications to the user-interface action of FIGS. 1A-1B can be triggered by the modifier hand shown in FIG. 8. In another example, the list 310 of items may scroll vertically in response to a user raising their left hand while performing a horizontal fling gesture, rather than horizontally as when the hand is not raised. In such a case, all of the items in list 310 may scroll vertically and be replaced by additional menu items. In a further example, selecting one of the menu items 320-328 may cause the system interface to display a vertical list of items which could be scrolled by using the right-handed horizontal fling gesture and raising the left hand gesture modifier.

Gesture modifiers are not limited to the hand gesture modifier illustrated in FIG. 8. Any movement or pose by the human target can be used as a gesture modifier. By way of example, a user may use their right hand to provide a gesture modifier for gestures performed by the left hand or other body part. A user may use a leg, finger, head or another suitable body part to indicate a gesture modifier. Any motion or pose may be defined by a gesture modifier filter in the gesture recognition engine to serve as a gesture modifier.

As earlier described, gesture modifiers are not limited to movements or poses by the tracked target, but can include other inputs such as physical objects, speech or electromechanical inputs. For example, a user may hold a physical object in their hand to indicate a modification to a gesture. A user may hold a physical object in their hand while performing a horizontal fling gesture to modify the gesture and thereby cause a modified or alternate user-interface action. For example, a user holding a wand in their hand may establish a user profile as a wizard in a game-play environment. In such a case, performing the horizontal fling gesture while holding the wand may initiate a wizard game play action rather than a menu scrolling function as when the same gesture is performed without the wand. It is noted that the user may hold the wand in the hand performing the gesture or another hand.

Similarly, speech commands may form gesture modifiers. A user may perform a gesture while issuing a speech gesture modifier to change the user-interface control triggered by the gesture. Continuing with the horizontal fling gesture example, a user may speak the word "fast" or "faster" to cause the scrolling function to more quickly move menu items in a list being scrolled. Likewise, the word "slow" or "slower" may trigger a slower scrolling of the menu items. The user could speak numbers which would indicate relative scrolling degrees, such as where speaking "one" may cause scrolling at a slow speed and higher numbers cause proportional increases in the scrolling action. A user may speak the word "page" to cause scrolling by a page of menu items. Additionally, a user may speak the words "end of list" to scroll to the last item in a list or "start of list" to scroll to the first item in a list.

Gesture modifiers can be applied to any gesture. By way of example, a gesture modifier may be applied to a vertical fling gesture to modify the rate or amount by which menu items are scrolled vertically by the user interface. A gesture modifier applied to the vertical fling gesture could also cause horizontal scrolling in place of vertical scrolling, or cause scrolling to proceed by page rather than by item. A gesture modifier to the press gesture may trigger backwards movement through the user-interface rather than selection of an item on screen as with the unmodified press gesture. In another example, a user can use a first hand gesture to point at and highlight items on screen without selecting them and causing a user-interface action. The user can then apply a modifier, such as by raising their other hand, to indicate that the highlighted item should be selected to cause a corresponding user-interface action. A modifier applied to a back gesture may trigger forward navigation through the user-interface while an unmodified back gesture may trigger backwards navigation. For example, the modified back gesture may cause movement from a higher level to a lower level in a menu hierarchy provided by the user-interface while the unmodified press gesture may cause movement from a lower level to a higher level. These functions could be reversed as well. A modifier applied to a two-handed press gesture may trigger a zoom function to zoom out of the current user-interface display, while an unmodified two-handed press gesture may trigger backwards navigation through the user-interface. These function could be reversed in an alternate embodiment. Further the amount of movement backwards or the amount of zooming could be modified based on the presence of a modifier. A modifier to a two-handed compression gesture may trigger a zoom function to zoom in on the current user-interface display, while the unmodified version may trigger zooming out of the current user-interface display. As another example, the unmodified gesture may trigger zooming in or out at a first rate or by a first amount while the modified gesture may trigger zooming in or out by a second rate that could be less or more than the first rate.

A gesture modifier can further indicate degrees of modification to a gesture that cause corresponding degrees of modification to the user-interface control triggered by performance of the gesture. A gesture modifier's filter may include metadata specifying ranges for one or more of the gesture modifier parameters. The measured skeletal tracking data can be compared with the ranges to not only determine if the data meets the modifier parameter, but also to determine in which parameter range the tracking data falls. Based on the determined range for the parameter, the gesture can be modified proportionately. Modifying the gesture can include causing an alternate or modified form of the corresponding UI control to be performed.

Consider the horizontal fling gesture and hand gesture modifier earlier described. FIGS. 9A-9C and 10A-10C depict skeletal mappings of two different instances of a human target performing a horizontal fling gesture and a hand gesture modifier. The skeletal mappings depict the user at points in time, with FIGS. 9A and 10A being first points in time and FIGS. 9C and 10C being last points in time. In this example, a variety of joints and bones are identified: each hand 402, each forearm 404, each elbow 406, each bicep 408, each shoulder 410, each hip 412, each thigh 414, each knee 416, each foreleg 418, each foot 420, the head 422, the torso 424, the top 426 and bottom 428 of the spine, and the waist 430. Where more points are tracked, additional features may be identified, such as the bones and joints of the fingers or toes, or individual features of the face, such as the nose and eyes.

In FIGS. 9A and 10A, the user begins with his right arm at his side extending downward toward his right foot with a slight bend at the right elbow. In FIG. 9A, his left arm is at his left side, but is raised with his left elbow below his shoulder and his left hand just above his left shoulder. In FIG. 10A, the user's left hand is also raised, but to a lower height than in FIG. 9A. The gesture recognition engine may interpret the starting positions in FIGS. 9A and 10A as both including a gesture modifier being performed by the user's left hand. The left hand being raised above the user's waist, in a general area at around the user's shoulder height, can be interpreted as raising the user's left hand to indicate a hand gesture modifier. This position for the gesture modifier may be defined as a virtual quadrant with a vertical component around the level of the user's shoulder or head and a horizontal component on the same side of the body as the hand. As will be described below, raising the left hand for a hand gesture modifier may also indicate the start of a gesture input period.

In FIGS. 9B and 10B, the user moves his right hand 402*a* along the horizontal X-axis toward the left side of his body while slightly raising the right arm in the vertical Y-axis direction. Although not visible in the two dimensional representations, it will be appreciated that by raising the right arm vertically, the user is extending his right arm toward the capture device, or along the Z-axis, by extending his right arm from beside his body to in front of his body. The user completes the horizontal fling gesture when his right hand reaches the furthest distance it will travel along the horizontal axis in the X direction towards the left portion of his body. The gesture recognition engine processes the right-handed movement while the user's left hand is raised to determine that a horizontal fling gesture has been satisfied. In FIGS. 9C and 10C, the user lowers their left hand. As will be described below, lowering the hand performing the hand gesture modifier may also indicate the end of a gesture input period.

The engine processes the left-handed movement to determine that a gesture modifier has been supplied during execution of the gesture. In this case, the amount by which or the height to which the user raises his left hand is used as a modification to the fling gesture. The engine determines a height of the user's hand and returns the height as a degree modifier to the fling gesture. Determining the height or amount may include determining from the hand gesture modifier filter which metadata range the position of the user's left hand falls within. The higher the user raises their left hand, the larger the modification to the right-handed gesture. If the fling gesture causes a user-interface scrolling action for the menu items in a UI interface as shown in FIGS. 1A-1B, the degree modifier can be used to determine an amount by which to scroll the menu items. More items can be scrolled on the display in response to a higher height of the left hand as shown in FIGS. 9A-9B when performing the horizontal fling gesture, as compared with the height of the user's left hand in FIGS. 10A-10B. For example, performing the horizontal fling gesture with the modifier shown in FIGS. 10A-10B may cause menu items in a list to scroll by one position, whereas performing the same horizontal fling gesture with the modifier shown in FIGS. 9A-9B may cause the same menu items in the list to scroll by two or more positions.

Unlike traditional touch-based gesture recognition systems which can identify the start and end of a user's gesture based on contact with a touch-screen, a user in a mid-air gesture detection system may not provide an explicit indication of a start and stop that can be detected by the system. For instance, a user may move continuously and transition from some random movement to a gesture movement. While the system can differentiate the beginning of a gesture from some random body location or movement based on subsequent movement in accordance with the gesture's filters, techniques to explicitly define the start and/or stop of a gesture may be beneficial. Accordingly, one embodiment utilizes a gesture modifier to indicate a gesture input period during which the user intends to provide a gesture.

Figure 11:
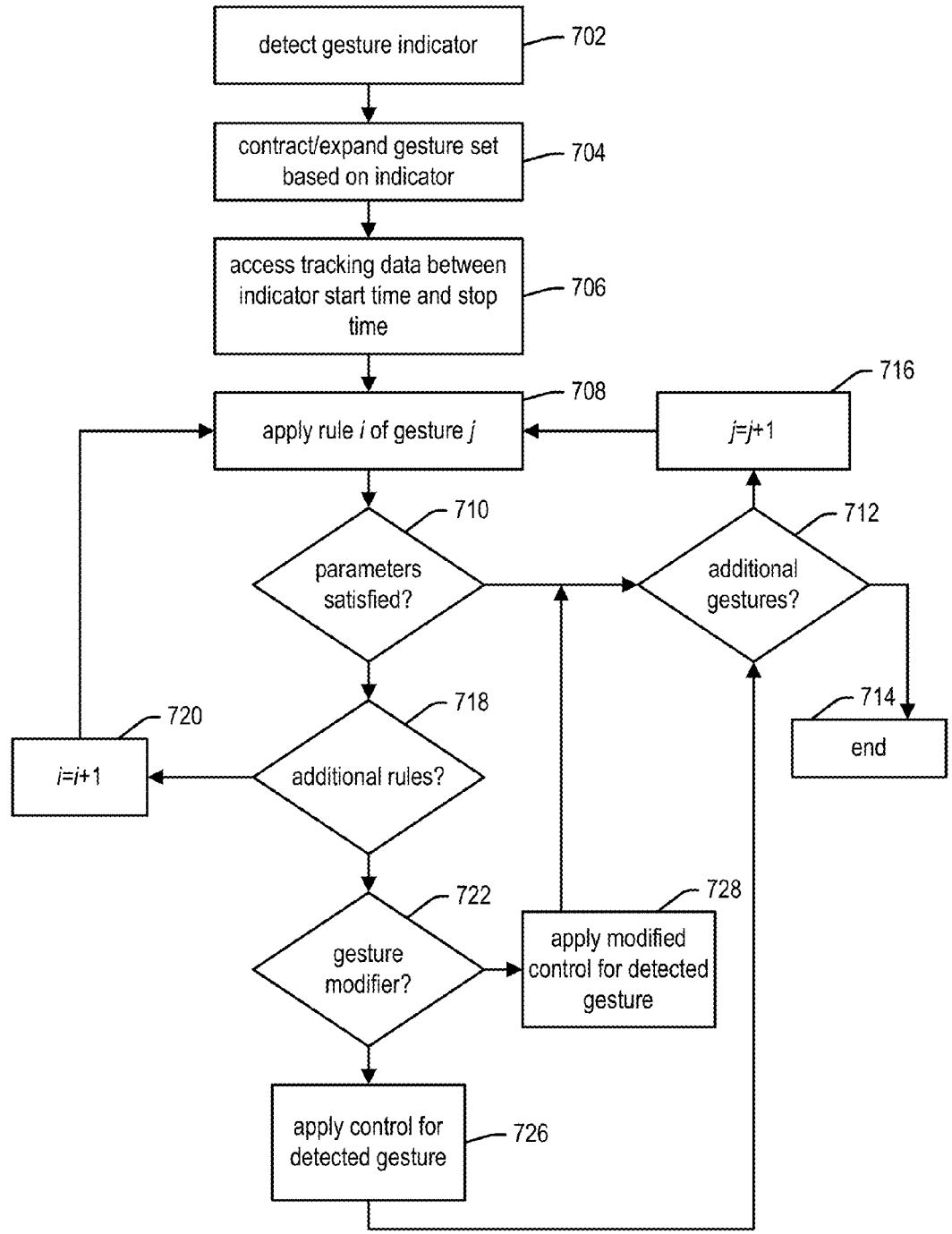
FIG. 11 is a flowchart describing one embodiment of a process for gesture recognition and control using gesture modifiers to indicate a gesture input period in accordance with one embodiment.

FIG. 11 is a flowchart describing one embodiment of a process for using gesture modifiers to indicate an intended gesture input. In this example, a gesture modifier specifies a period during which a gesture is intended to be performed. In response to a user providing a gesture modifier, the system identifies a gesture period during which the target's movement is analyzed to determine whether a gesture was performed.

At step 702, the gesture recognition engine detects a gesture modifier indicating an intended gesture input period. A gesture modifier may indicate a start and stop time to define the period therebetween as a gesture input period. Step 702 can include determining the start of a gesture input period and the end of a gesture input period in one embodiment. The engine may track the user's movements and apply one or more gesture modifier filters as described in steps 602-618 of FIG. 7 to determine if a gesture modifier is performed. For example, a user may raise one hand as shown in FIG. 9A to indicate a gesture is going to be performed (e.g., by their other hand or other body part(s)), thus triggering the start of a gesture input period. The user may lower their hand after performing the gesture as shown in FIG. 9C, thus triggering the end of a gesture input period. In other examples, the user may present a physical object to indicate a gesture input period. The user may present a card (e.g., of a particular color) or other physical object to indicate a gesture modifier period. When the period is complete, the user may remove the physical object, such as by turning the card to a different color or by placing the physical object out of the capture device's field of view. Other gesture modifier inputs may be provided such as an electromechanical control to indicate a start and stop time. Speech may also be analyzed to indicate a start and stop period. For example, the system may interpret the time between a user speaking "start" and "stop" as a gesture input period.

At step 704, the engine determines whether the gesture modifier contracts or expands the viable or active gesture set. A gesture modifier may have an associated viable gesture set such that the system looks only for gestures corresponding to the gesture modifier. Step 704 can include adding additional viable gestures to be analyzed or removing gestures from the currently viable gestures. At step 706, the engine accesses the skeletal mapping data for the target between the start and stop time specified by the gesture modifier. At step 708, the engine accesses the first rule i=1 of the first gesture j in the active gesture set and at step 710, determines if each parameter of the rule is satisfied. If each parameter is not satisfied, the engine determines if additional gestures are viable in the active gesture set at step 712. If there are no additional gestures, the method ends at step 714. In one embodiment, one or more gesture not satisfied responses can be returned to the operating system or application at step 714. If there are additional active gestures, the next gesture is accessed at step 716 by increasing j by one and returning to step 708.

If each parameter of the gesture is satisfied at step 710, the engine determines whether the current gesture j contains additional rules i at step 718. If so, i is increased by one at step 720 and the next rule is accessed at step 708. If all the rules have been satisfied as determined at step 718, the engine determines whether a gesture modifier is present at step 722. In one embodiment, the gesture modifier indicating a gesture input period as determined at step 702 can itself provide a modification of the UI action performed in response to the detected gesture. As described in FIGS. 9A-9C, raising the user's left hand may cause a modification to the horizontal fling gesture, such as to control a number of menu items scrolled in response to detection of the gesture. Thus, raising the user's left hand may indicate the start of a gesture input period and also to modify a gesture detected during the gesture input period. In another embodiment, a separate input such as an additional gesture, physical object or speech may be provided to modify the UI action.

If a gesture modifier is not present, a first UI action corresponding to the detected gesture is performed at step 726. If a gesture modifier was detected at step 722, a second UI action is performed at step 728. As earlier described, the second UI action is a modified form of the first UI action in one embodiment. After applying the first or second UI action, the method returns to step 712 to determine if there are additional gestures to analyze in the active gesture set.

It is noted that a user's movement satisfying a particular gesture filter may trigger a corresponding user-interface action whether or not the movement is detected during an intended gesture input period. In one embodiment, however, a user's movement may only trigger a corresponding user-interface action if detected during an intended gesture input period.

In one embodiment, a gesture modifier is used to start an open-ended gesture input or tracking period. Similar to the technique described in FIG. 11, a user may initiate tracking of movements by providing a gesture modifier. In this case, however, the modifier does not define a stop time. Instead, the modifier indicates to the system that their interactions and movements should be tracked and passed through the recognition engine until the user is no longer tracked. In one example, a wave gesture is used to indicate that subsequent interactions should be tracked. A wave gesture can include a user moving either hand horizontally in front of their body in a traditional waving motion. This movement generally includes a vertical component defining an arc as the user moves their hand horizontally. The filter for this movement may define a starting position parameter, a distance traveled in front of the user's body and vertical displacement of the hand up and down as the hand travels horizontally. In one example, the filter may provide a positional parameter defining, e.g., that the user's hand be raised in front of the body and above the elbow, a size parameter relating to both velocity and position defining, e.g., a size of the wave and how fast the hand performs the movement, and periodic parameter, defining a minimum degree of consistency throughout the wave motion. In response to detection of the wave gesture modifier, the system will indefinitely track the user's movements and interactions until some other event ends the tracking process.

In one embodiment, an 'escape' is provided to allow a user to stop performing a gesture that they have accidentally begun. The system provides feedback that the user has begun a gesture. The user may complete the gesture by moving in such a way as to fit the completion criteria. Alternatively, the user can move to fit a different set of criteria that terminates the gesture. This two stage process can further reduce false positives.

Figure 12:
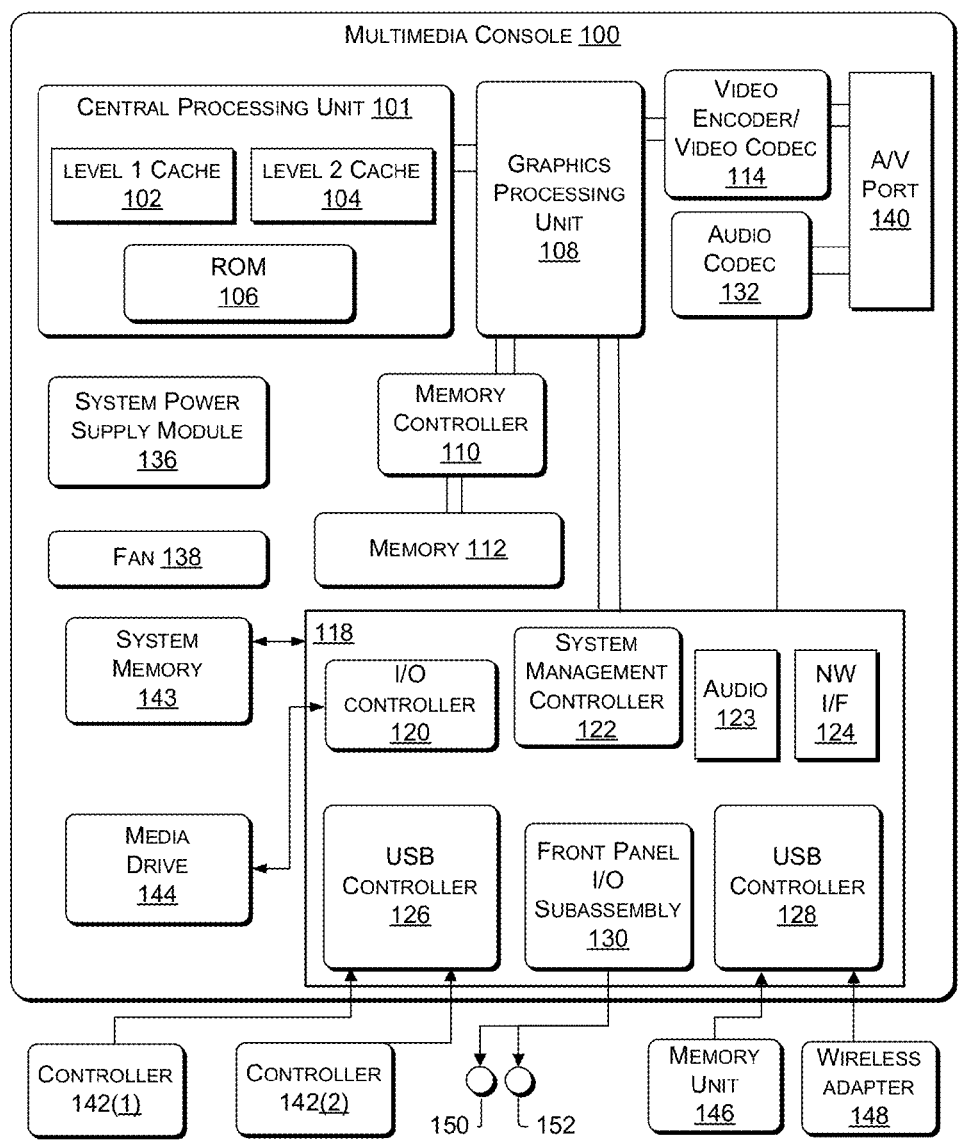
FIG. 12 illustrates one embodiment of a computing system that may be used to track motion and update an application based on the tracked motion.

FIG. 12 illustrates an example of a computing environment 100 that may be used to implement the computing environment 12 of FIGS. 1A-2. The computing environment 100 of FIG. 12 may be a multimedia console 100, such as a gaming console. As shown in FIG. 12, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 74 and 76 and capture device 60 may define additional input devices for the console 100.

Figure 13:
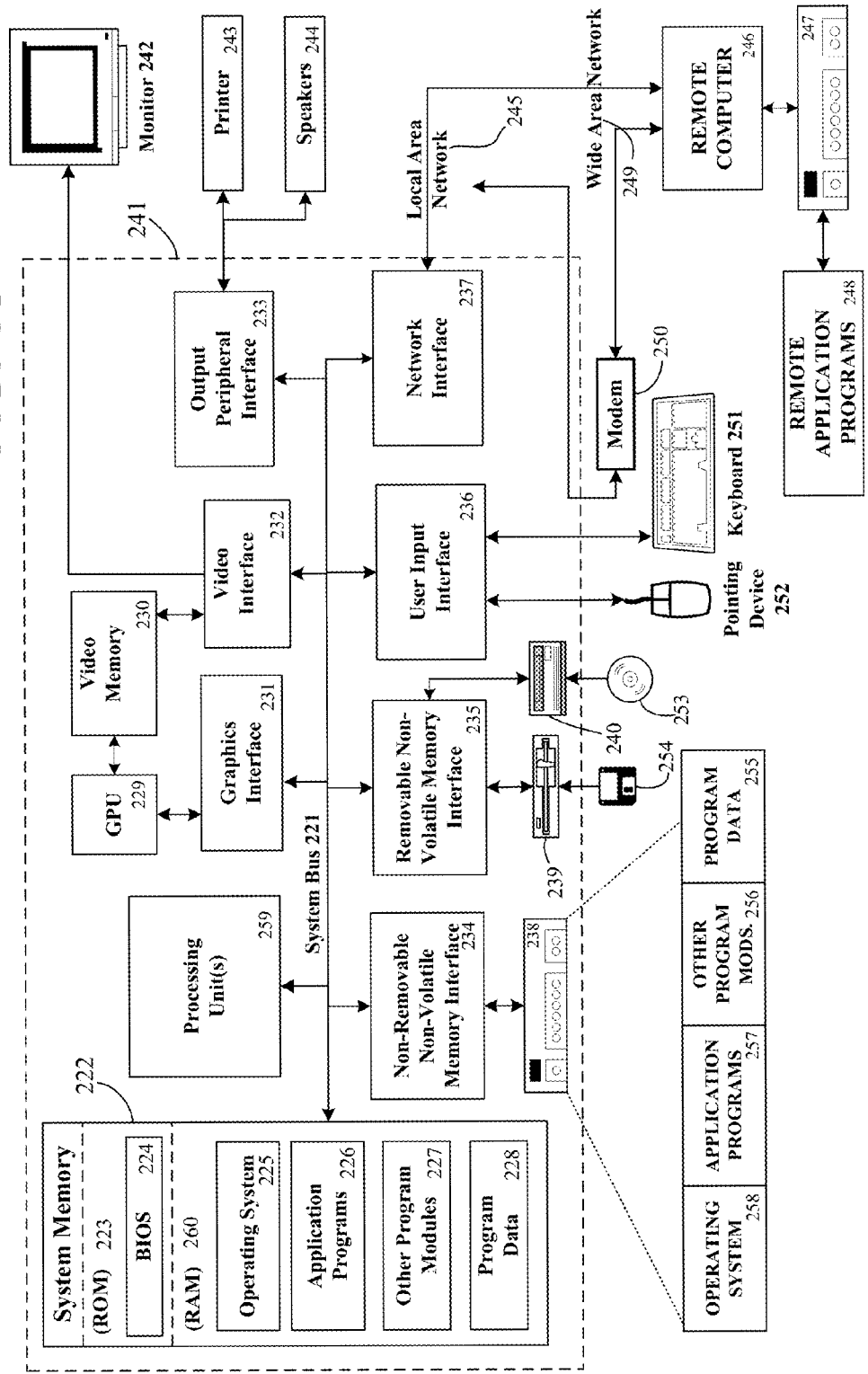
FIG. 13 illustrates one embodiment of a computing system that may be used to track motion and update an application based on the tracked motion.

FIG. 13 illustrates another example of a computing environment 220 that may be used to implement the computing environment 52 shown in FIGS. 1A-2. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples, the term circuitry can include a general-purpose processing unit, memory, etc., configured by software instructions that embody logic operable to perform function(s). In embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 13, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 12 illustrates operating system 225, application programs 226, other program modules 227, and program data 228.

The computer 241 may also include other removable/non-removable, volatile/nonvolatile computer storage media. By way of example, FIG. 12 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 13, provide storage of computer readable instructions, data structures, program modules and other data for the computer 241. In FIG. 13, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 74, 76 and capture device 60 may define additional input devices for the computer 241. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 13. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 13 illustrates remote application programs 248 as residing on memory device 247. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method of operating a user-interface using mid-air motion of a human target, comprising:
   receiving a plurality of images from a capture device, the plurality of images including the human target;
   tracking movement of the human target from the plurality of images using skeletal mapping of the human target;
   determining from the skeletal mapping whether the movement of the human target satisfies one or more filters for a first mid-air gesture, the first mid-air gesture is performed by a first hand of the user;
   determining whether a modifier for the first mid-air gesture is present by determining whether a second hand of the human target satisfies a position parameter of a first gesture modifier filter, the position parameter defines a plurality of ranges for a position of the second hand;
   if the movement of the human target satisfies the one or more filters and the modifier is not present, performing a first user-interface action corresponding to the first mid-air gesture, the first user-interface action includes navigating through a list of menu items by a first amount; and
   if the movement of the human target satisfies the one or more filters and the modifier is present, performing a second user-interface action corresponding to the first mid-air gesture, the second user-interface action includes navigating through the list of menu items by a second amount when the position of the second hand is in a first range and navigating through the list of menu items by a third amount when the position of the second hand is in a second range.

2. A method according to claim 1, wherein the second user-interface action is a modified version of the first user-interface action.

3. A method according to claim 1, wherein:
   the position parameter defines a virtual quadrant for the second hand above the user's waist.

4. A method according to claim 1, wherein determining whether the movement of the human target satisfies the one or more filters for the mid-air gesture includes:
   determining whether a position of the first hand of the human target satisfies a starting position parameter,
   determining whether a direction of movement of the first hand from the starting position satisfies a directional parameter, and
   determining whether a distance traveled by the first hand during the movement satisfies a distance parameter.

5. A method according to claim 1, wherein:
   determining whether the modifier for the first mid-air gesture is present includes determining whether the human target is holding a modifier object.

6. A method according to claim 5, wherein:
   the first user-interface action is an operating system user-interface control; and
   the second user-interface action is a game-play control.

7. A method according to claim 1, wherein:
   determining whether the modifier for the first mid-air gesture is present includes determining whether the human target issues a speech modifier.

8. A method according to claim 1, wherein the plurality of images is a plurality of depth images.

9. One or more processor readable storage devices having processor readable code embodied on the one or more processor readable storage devices, the processor readable code for programming one or more processors to perform a method comprising:
   receiving depth information of a capture area including a human target;
   creating a skeletal model for mapping movement of the human target over time;
   detecting a gesture modifier from the human target that indicates a gesture period by determining that the human target has raised a hand to a position satisfying a gesture modifier filter parameter;
   determining a start of the gesture period based on a time at which the human target raises the hand;
   in response to detecting the gesture modifier, determining from the skeletal mapping whether movement of the human target during the gesture period satisfies one or more filters for a first mid-air gesture;
   if the movement of the human target during the gesture period satisfies the one or more filters, performing a first user-interface action corresponding to the first mid-air gesture;
   determining that the human target has lowered their hand from the position satisfying the gesture modifier filter parameter; and
   determining an end of the gesture period based on a time at which the human target lowers the hand.

10. One or more processor readable storage devices according to claim 9, the method further comprising:
    prior to detecting the gesture modifier, determining whether movement of the human target satisfies a first set of viable gestures;
    in response to detecting the gesture modifier:
       determining that the gesture modifier is associated with a second set of viable gestures, the second set of viable gestures including the first mid-air gesture and being different from the first set of viable gestures, and
       only determining from the skeleton mapping whether the movement of the human target satisfies the second set of viable gestures.

11. One or more processor readable storage devices according to claim 9, wherein movement of the human target outside of the gesture period that satisfies the one or more filters will not trigger performance of the first user-interface action corresponding to the first mid-air gesture.

12. One or more processor readable storage devices according to claim 9, wherein movement of the human target outside of the gesture period that satisfies the one or more filters will trigger performance of the first user-interface action corresponding to the first mid-air gesture.

13. One or more processor readable storage devices according to claim 9, wherein:
   determining whether the modifier for the first mid-air gesture is present includes determining whether the human target is holding a modifier object.

14. One or more processor readable storage devices according to claim 9, wherein:
   determining whether the modifier for the first mid-air gesture is present includes determining whether the human target issues a speech modifier.

15. A method of operating a user-interface using mid-air motion of a human target, comprising:
   tracking movement of a human target from a plurality of depth images using skeletal mapping of the human target in a known three-dimensional coordinate system;
   determining from the skeletal mapping whether movement including a first hand of the human target satisfies one or more filters for a first mid-air gesture;
   determining from the skeletal mapping whether a second hand of the human target satisfies one or more filters for a modifier of the first mid-air gesture, including determining whether the second hand of the human target satisfies a position parameter, the one or more filters for the modifier of the first mid-air gesture define a plurality of ranges for a position of the second hand;
   if the movement including the first hand of the human target satisfies the one or more filters for the first mid-air gesture and the second hand of the human target does not satisfy the one or more filters for the modifier of the first mid-air gesture, performing a first user-interface action, the first user-interface action includes navigating through a list of menu items by a first amount; and
   if the movement including the first hand of the human target satisfies the one or more filters for the first mid-air gesture and the second hand of the human target satisfies the one or more filters for the modifier of the first mid-air gesture, performing a second user-interface action, the second user-interface action includes navigating through the list of menu items by a second amount when the position of the second hand is in a first range and navigating through the list of menu items by a third amount when the position of the second hand is in a second range.

16. A method of operating a user-interface using mid-air motion of a human target, comprising:
   tracking movement of a human target from a plurality of depth images using skeletal mapping of the human target in a known three-dimensional coordinate system;
   determining from the skeletal mapping whether movement including a first hand of the human target satisfies one or more filters for a first mid-air gesture, the first mid-air gesture is a horizontal fling gesture;
   determining from the skeletal mapping whether a second hand of the human target satisfies one or more filters for a modifier of the first mid-air gesture;
   if the movement including the first hand of the human target satisfies the one or more filters for the first mid-air gesture and the second hand of the human target does not satisfy the one or more filters for the modifier of the first mid-air gesture, performing a first user-interface action, the first user-interface action includes horizontally scrolling a list of a menu items; and
   if the movement including the first hand of the human target satisfies the one or more filters for the first mid-air gesture and the second hand of the human target satisfies the one or more filters for the modifier of the first mid-air gesture, performing a second user-interface action, the second user-interface action includes vertically scrolling a list of menu items.

\* \* \* \* \*